US012666494B2

(12) United States Patent
Saggar et al.

(10) Patent No.: US 12,666,494 B2
(45) Date of Patent: Jun. 23, 2026

(54) TECHNIQUES FOR RELATIVE POSITIONING OF WAKEUP SIGNALS AND REFERENCE SIGNALS

(71) Applicant: QUALCOMM Incorporated, San Diego, CA (US)

(72) Inventors: Hemant Saggar, San Diego, CA (US); Igor Gutman, Hod HaSharon (IL); Tao Luo, San Diego, CA (US)

( * ) Notice: Subject to any disclaimer, the term of this patent is extended or adjusted under 35 U.S.C. 154(b) by 309 days.

(21) Appl. No.: 18/589,204

(22) Filed: Feb. 27, 2024

(65) Prior Publication Data

US 2025/0275010 A1 Aug. 28, 2025

(51) Int. Cl.
*H04W 76/28* (2018.01)
*H04L 5/00* (2006.01)
*H04W 8/22* (2009.01)
*H04W 52/02* (2009.01)
*H04W 72/0446* (2023.01)

(52) U.S. Cl.
CPC ........... *H04W 76/28* (2018.02); *H04L 5/0051* (2013.01); *H04W 8/22* (2013.01); *H04W 52/0235* (2013.01); *H04W 72/0446* (2013.01)

(58) Field of Classification Search
None
See application file for complete search history.

(56) References Cited

U.S. PATENT DOCUMENTS

| | | |
|---|---|---|
| 2022/0225151 A1 | 7/2022 | Zhang et al. |
| 2023/0041767 A1* | 2/2023 | Manolakos ........... H04W 76/28 |
| 2023/0300750 A1 | 9/2023 | Wu et al. |

FOREIGN PATENT DOCUMENTS

| | | | |
|---|---|---|---|
| WO | WO-2020029890 A1 * | 2/2020 | ........... H04L 5/0048 |

OTHER PUBLICATIONS

International Search Report and Written Opinion—PCT/US2025/011599—ISA/EPO—May 9, 2025.

* cited by examiner

*Primary Examiner* — Christine T Duong

(57) ABSTRACT

Methods, systems, and devices for wireless communications are described. A user equipment (UE) may operate in a discontinuous reception (DRX) mode. The UE may receive control messages indicating reference signal and wakeup signal (WUS) configurations. The reference signal configuration may indicate a reference signal position associated with reference signals and the WUS configuration may indicate a WUS position associated with WUSs and within a time-domain offset of the reference signal position. For example, the WUS position may be directly before or after the reference signal position. The offset may be based on durations associated with the UE transitioning (e.g., ramping up and ramping down) between sleep modes and an awake mode. The reference signal position may be within a DRX cycle period offset in time from the WUS position. The UE may monitor for the WUSs, the reference signals, and in some implementations, data, according to the offset.

30 Claims, 22 Drawing Sheets

Receiver

1010

Communications Manager

1020

Transmitter

1015

1005

1000

130

105

115

Network
Entity

Transceiver

Antenna

1710

1715

Communications
Manager

Memory

Code

1730

1720

1725

1740

Processor

1735

1705

1700

Figure 18:
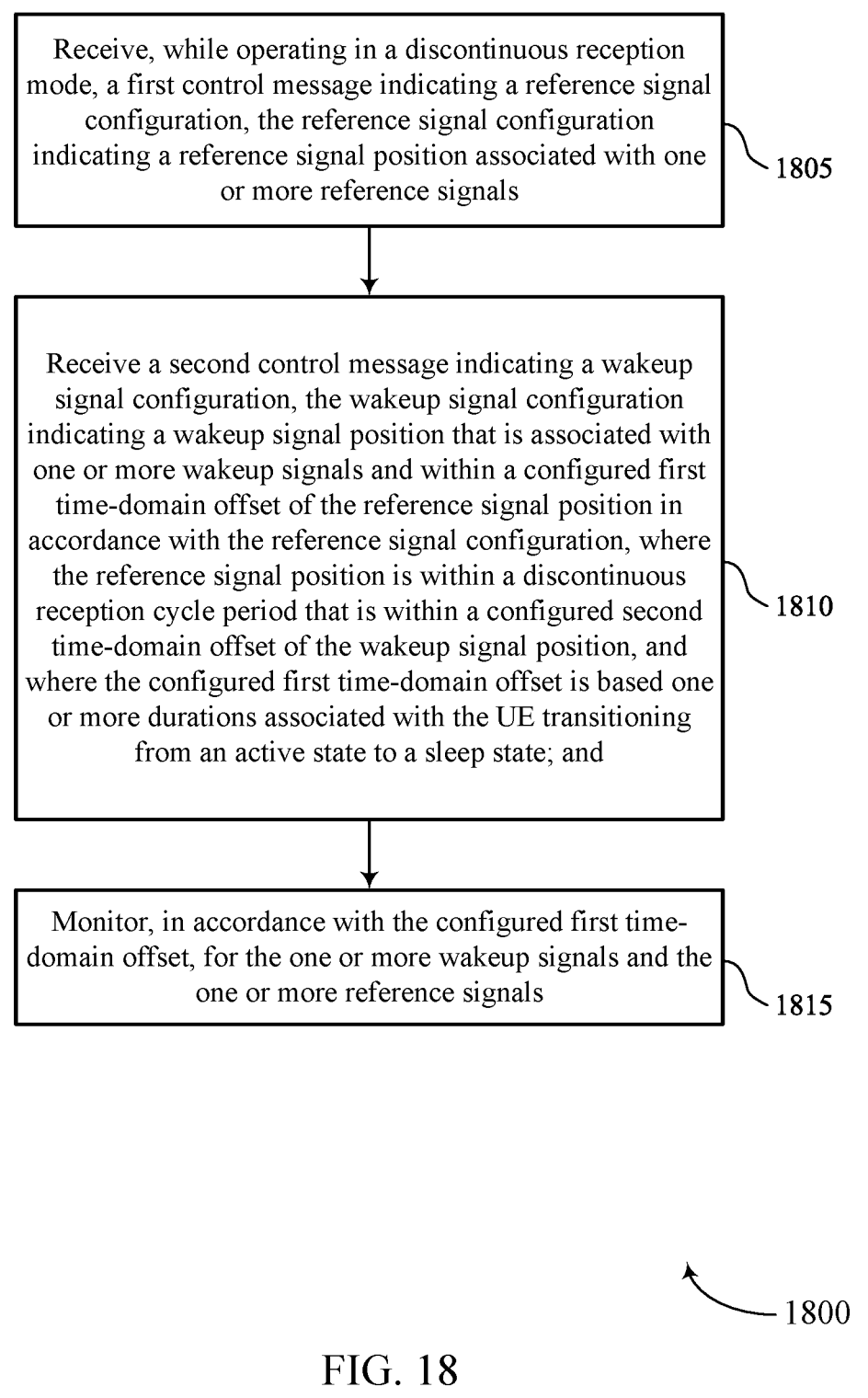

Receive, while operating in a discontinuous reception mode, a first control message indicating a reference signal configuration, the reference signal configuration indicating a reference signal position associated with one or more reference signals ⟍ 1805

↓

Receive a second control message indicating a wakeup signal configuration, the wakeup signal configuration indicating a wakeup signal position that is associated with one or more wakeup signals and within a configured first time-domain offset of the reference signal position in accordance with the reference signal configuration, where the reference signal position is within a discontinuous reception cycle period that is within a configured second time-domain offset of the wakeup signal position, and where the configured first time-domain offset is based one or more durations associated with the UE transitioning from an active state to a sleep state; and ⟍ 1810

↓

Monitor, in accordance with the configured first time-domain offset, for the one or more wakeup signals and the one or more reference signals ⟍ 1815

Figure 19:
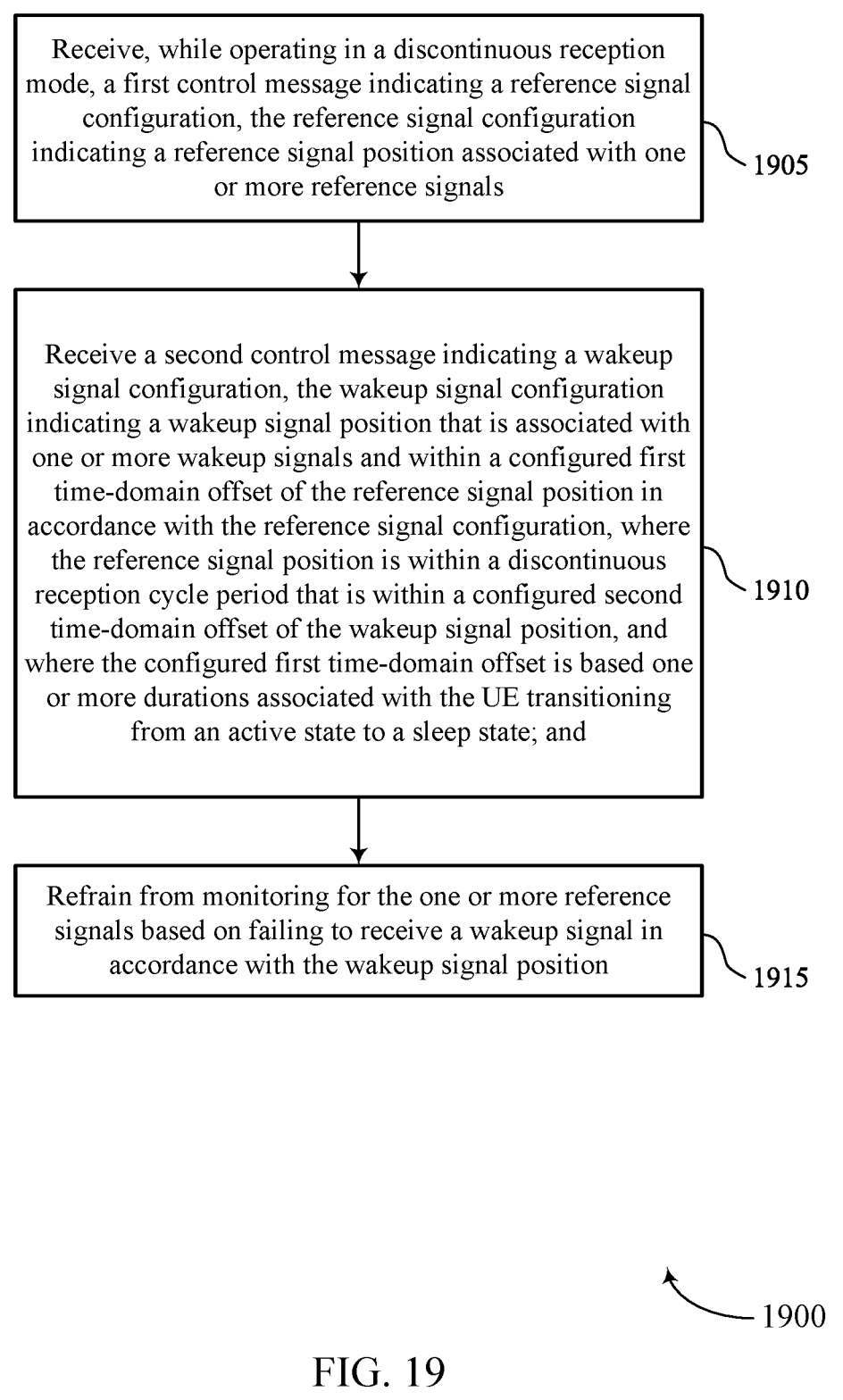

Receive, while operating in a discontinuous reception mode, a first control message indicating a reference signal configuration, the reference signal configuration indicating a reference signal position associated with one or more reference signals

1905

Receive a second control message indicating a wakeup signal configuration, the wakeup signal configuration indicating a wakeup signal position that is associated with one or more wakeup signals and within a configured first time-domain offset of the reference signal position in accordance with the reference signal configuration, where the reference signal position is within a discontinuous reception cycle period that is within a configured second time-domain offset of the wakeup signal position, and where the configured first time-domain offset is based one or more durations associated with the UE transitioning from an active state to a sleep state; and

1910

Refrain from monitoring for the one or more reference signals based on failing to receive a wakeup signal in accordance with the wakeup signal position

Figure 20:
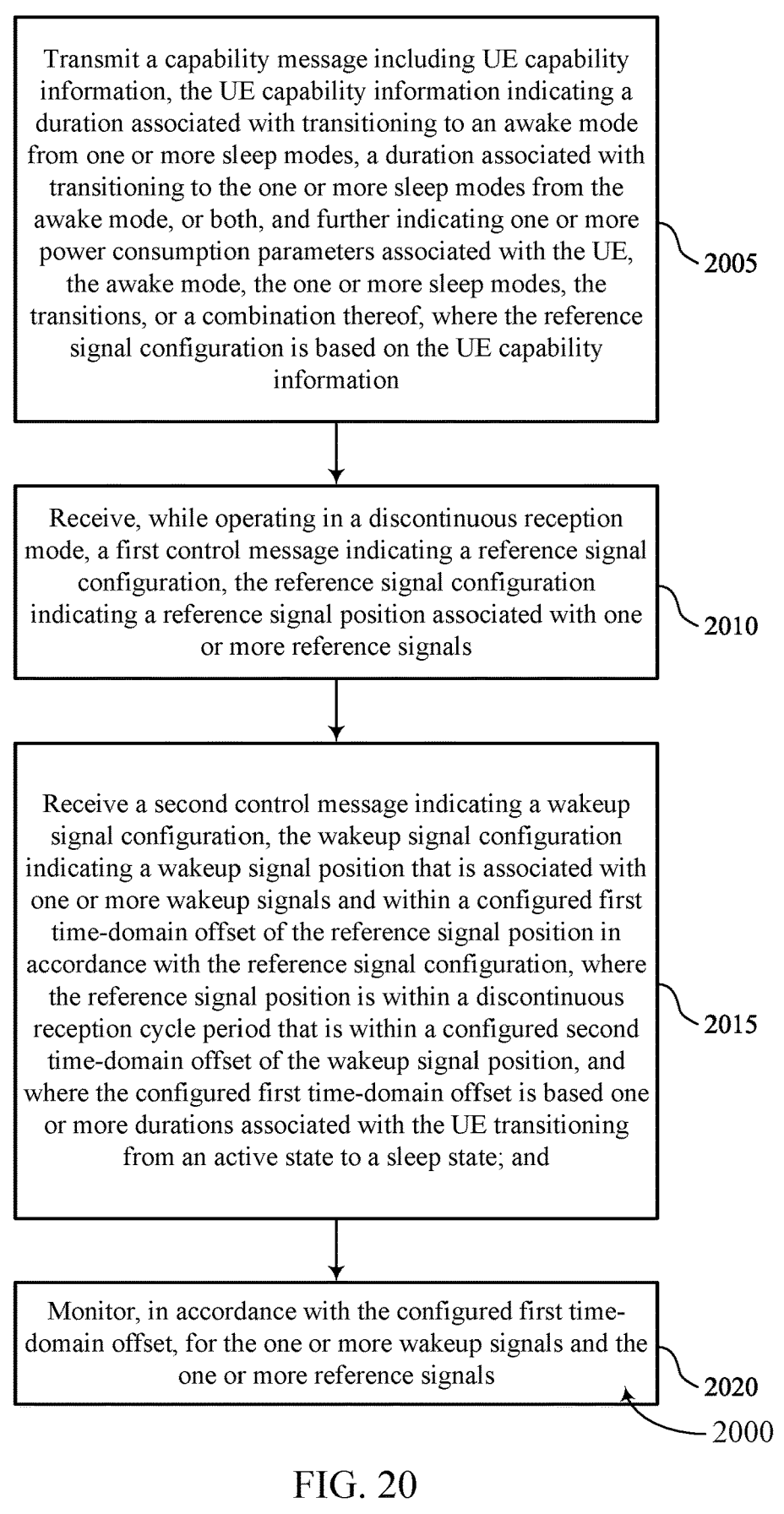

Transmit a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof, where the reference signal configuration is based on the UE capability information

⎞ 2005

Receive, while operating in a discontinuous reception mode, a first control message indicating a reference signal configuration, the reference signal configuration indicating a reference signal position associated with one or more reference signals

⎞ 2010

Receive a second control message indicating a wakeup signal configuration, the wakeup signal configuration indicating a wakeup signal position that is associated with one or more wakeup signals and within a configured first time-domain offset of the reference signal position in accordance with the reference signal configuration, where the reference signal position is within a discontinuous reception cycle period that is within a configured second time-domain offset of the wakeup signal position, and where the configured first time-domain offset is based one or more durations associated with the UE transitioning from an active state to a sleep state; and

⎞ 2015

Monitor, in accordance with the configured first time-domain offset, for the one or more wakeup signals and the one or more reference signals

Figure 21:
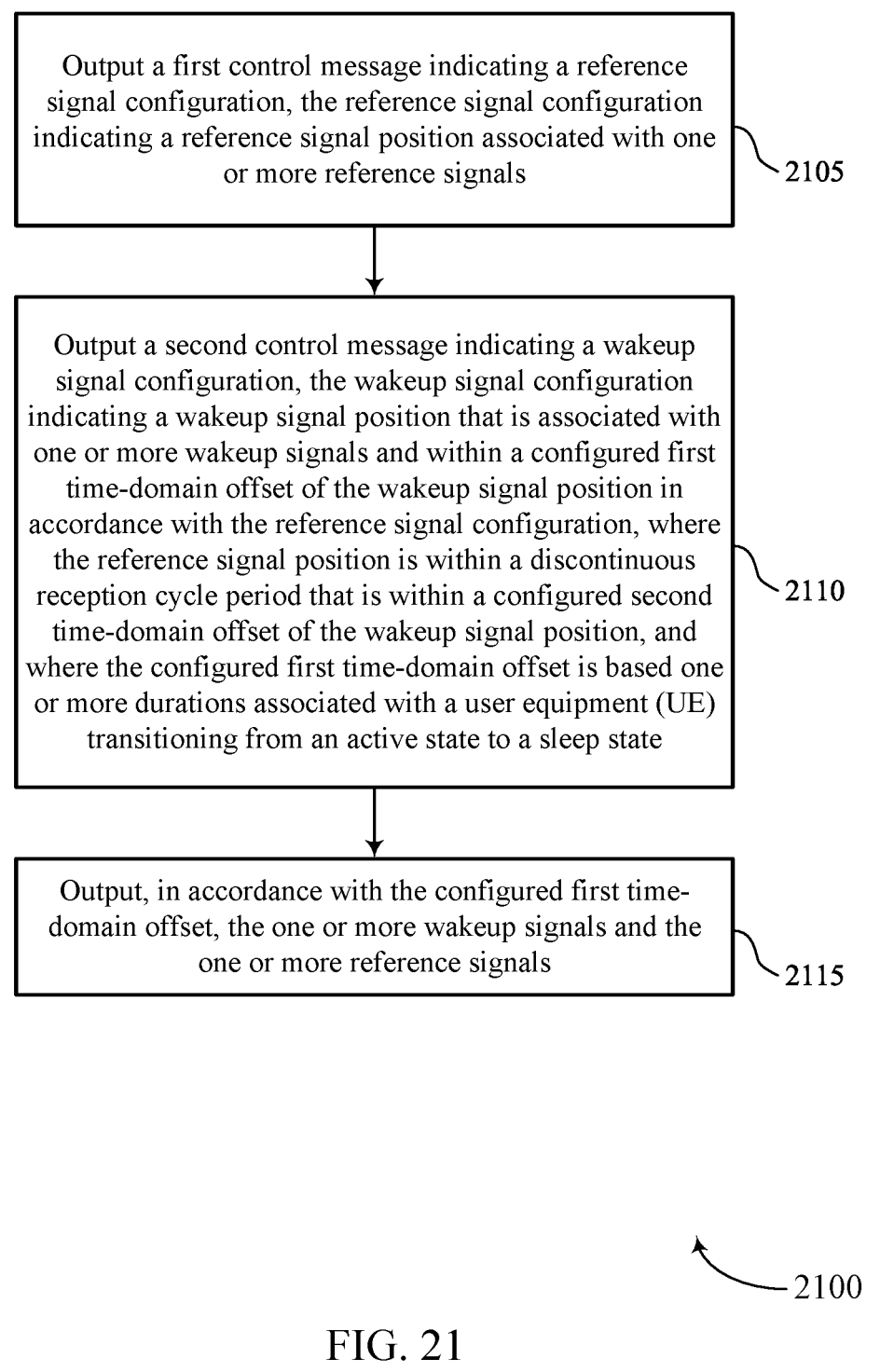

Output a first control message indicating a reference signal configuration, the reference signal configuration indicating a reference signal position associated with one or more reference signals ⟩ 2105

Output a second control message indicating a wakeup signal configuration, the wakeup signal configuration indicating a wakeup signal position that is associated with one or more wakeup signals and within a configured first time-domain offset of the wakeup signal position in accordance with the reference signal configuration, where the reference signal position is within a discontinuous reception cycle period that is within a configured second time-domain offset of the wakeup signal position, and where the configured first time-domain offset is based one or more durations associated with a user equipment (UE) transitioning from an active state to a sleep state ⟩ 2110

Output, in accordance with the configured first time-domain offset, the one or more wakeup signals and the one or more reference signals ⟩ 2115

Figure 22:
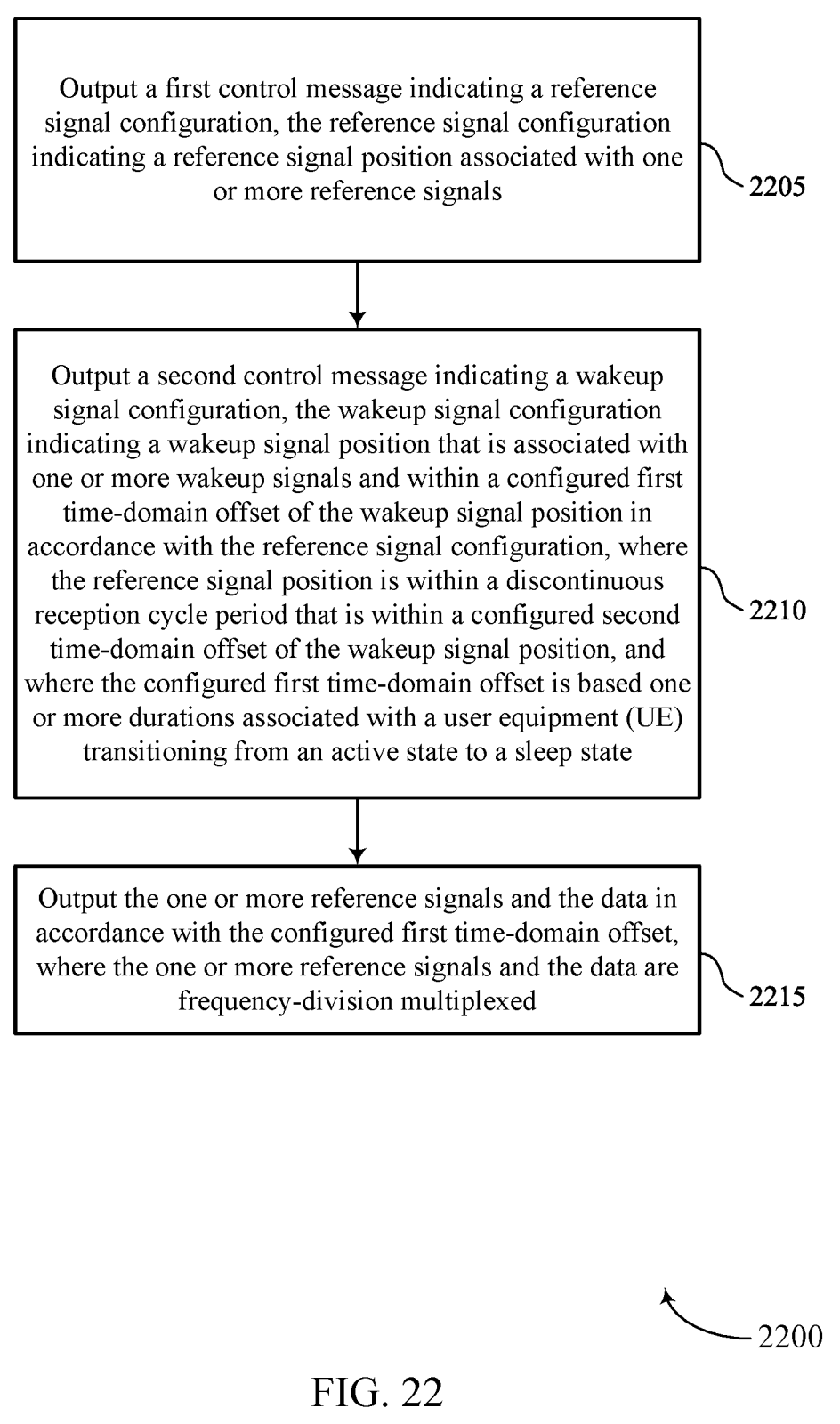

Output a first control message indicating a reference signal configuration, the reference signal configuration indicating a reference signal position associated with one or more reference signals

2205

Output a second control message indicating a wakeup signal configuration, the wakeup signal configuration indicating a wakeup signal position that is associated with one or more wakeup signals and within a configured first time-domain offset of the wakeup signal position in accordance with the reference signal configuration, where the reference signal position is within a discontinuous reception cycle period that is within a configured second time-domain offset of the wakeup signal position, and where the configured first time-domain offset is based one or more durations associated with a user equipment (UE) transitioning from an active state to a sleep state

2210

Output the one or more reference signals and the data in accordance with the configured first time-domain offset, where the one or more reference signals and the data are frequency-division multiplexed

TECHNIQUES FOR RELATIVE POSITIONING OF WAKEUP SIGNALS AND REFERENCE SIGNALS

FIELD OF TECHNOLOGY

The following relates to wireless communications, including techniques for relative positioning of wakeup signals (WUSs) and reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for relative positioning of wakeup signals (WUSs) and reference signals. For example, the described techniques provide for relative positioning of WUSs and reference signals such that the UE may transition between awake and sleep modes more efficiently. While the UE operates in a discontinuous reception (DRX) mode, the UE may receive a first control message indicating a reference signal configuration and a second control message indicating a WUS configuration. The reference signal configuration may indicate a position at which the UE may receive one or more reference signals (e.g., a reference signal position associated with one or more reference signals, such as synchronization signal blocks (SSBs)). The WUS configuration may indicate a position in the time domain during which the UE may receive one or more WUSs (e.g., a WUS position). In some examples, the WUS position may be within a first time-domain offset of the reference signal position based on the reference signal configuration. That is, a network entity may configure the WUS position relative to the reference signal position, or the network entity may configure the reference signal position relative to the WUS position. In addition, the reference signal position may be within a DRX cycle period that is within a second time-domain offset of the WUS position. The first time-domain offset may be based on one or more durations associated with the UE transitioning from an active state to a sleep state (e.g., entering a sleep mode). The UE may monitor for the one or more WUSs and the one or more reference signals in accordance with the first time-domain offset.

A method for wireless communications by a UE is described. The method may include receiving, while operating in a DRX mode, a first control message indicating a reference signal configuration, the reference signal configuration indicating a reference signal position associated with one or more reference signals, receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and monitoring, in accordance with the configured first time-domain offset, for the one or more WUSs and the one or more reference signals.

A UE for wireless communications is described. The UE may include one or more memories storing processor executable code, and one or more processors coupled with the one or more memories. The one or more processors may individually or collectively be operable to execute the code to cause the UE to receive, while operating in a DRX mode, a first control message indicating a reference signal configuration, the reference signal configuration indicating a reference signal position associated with one or more reference signals, receive a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and monitor, in accordance with the configured first time-domain offset, for the one or more WUSs and the one or more reference signals.

Another UE for wireless communications is described. The UE may include means for receiving, while operating in a DRX mode, a first control message indicating a reference signal configuration, the reference signal configuration indicating a reference signal position associated with one or more reference signals, means for receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and means for monitoring, in accordance with the configured first time-domain offset, for the one or more WUSs and the one or more reference signals.

A non-transitory computer-readable medium storing code for wireless communications is described. The code may include instructions executable by one or more processors to receive, while operating in a DRX mode, a first control message indicating a reference signal configuration, the reference signal configuration indicating a reference signal position associated with one or more reference signals, receive a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and monitor, in accordance with the configured first time-domain offset, for the one or more WUSs and the one or more reference signals.

In some examples of the method, UEs, and non-transitory computer-readable medium described herein, the reference signal position may be before the WUS position in time in accordance with the configured first time-domain offset.

In some examples of the method, UEs, and non-transitory computer-readable medium described herein, the reference signal position may be after the WUS position in time in accordance with the configured first time-domain offset.

In some examples of the method, UEs, and non-transitory computer-readable medium described herein, the reference signal position may be associated with an SMTC and may be after the WUS position in time in accordance with the configured first time-domain offset and the reference signal position may be followed by a data position associated with data.

Some examples of the method, UEs, and non-transitory computer-readable medium described herein may further include operations, features, means, or instructions for refraining from monitoring for the one or more reference signals based on failing to receive a WUS in accordance with the WUS position.

In some examples of the method, UEs, and non-transitory computer-readable medium described herein, the reference signal position may be after the WUS position in time in accordance with the configured first time-domain offset and the reference signal position at least partially overlaps with a data position associated with data.

Some examples of the method, UEs, and non-transitory computer-readable medium described herein may further include operations, features, means, or instructions for monitoring for the one or more reference signals and the data in accordance with the configured first time-domain offset, where the one or more reference signals and the data may be time-division multiplexed.

Some examples of the method, UEs, and non-transitory computer-readable medium described herein may further include operations, features, means, or instructions for monitoring for the one or more reference signals and the data in accordance with the configured first time-domain offset, where the one or more reference signals and the data may be frequency-division multiplexed.

Some examples of the method, UEs, and non-transitory computer-readable medium described herein may further include operations, features, means, or instructions for transmitting a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof, where the reference signal configuration may be based on the UE capability information.

In some examples of the method, UEs, and non-transitory computer-readable medium described herein, the reference signal configuration indicates respective time-domain gaps at least before or after the reference signal position during which data may be excluded from transmission.

In some examples of the method, UEs, and non-transitory computer-readable medium described herein, the configured first time-domain offset applies between the reference signal position and a configured ON duration for the DRX mode.

In some examples of the method, UEs, and non-transitory computer-readable medium described herein, the first control message indicates one or more additional reference signal configurations indicating respective reference signal positions associated with one or more additional reference signals that may be periodic or semi-persistent and the configured first time-domain offset applies between reference signal positions of at least one pair of additional reference signals, the one or more reference signals, and the one or more WUSs.

In some examples of the method, UEs, and non-transitory computer-readable medium described herein, the reference signal configuration corresponds to one or more UEs within one or more cells and the WUS configuration corresponds to one or more UEs or a group of UEs, and an additional reference signal configuration corresponds to the UE.

In some examples of the method, UEs, and non-transitory computer-readable medium described herein, the monitoring may be performed while the UE may be in an awake mode or one or more sleep modes.

A method for wireless communications by a network entity is described. The method may include outputting a first control message indicating a reference signal configuration, the reference signal configuration indicating a reference signal position associated with one or more reference signals, outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state, and outputting, in accordance with the configured first time-domain offset, the one or more WUSs and the one or more reference signals.

A network entity for wireless communications is described. The network entity may include one or more memories storing processor executable code, and one or more processors coupled with the one or more memories. The one or more processors may individually or collectively be operable to execute the code to cause the network entity to output a first control message indicating a reference signal configuration, the reference signal configuration indicating a reference signal position associated with one or more reference signals, output a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state, and output, in accordance with the configured first time-domain offset, the one or more WUSs and the one or more reference signals.

Another network entity for wireless communications is described. The network entity may include means for outputting a first control message indicating a reference signal configuration, the reference signal configuration indicating a reference signal position associated with one or more reference signals, means for outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state, and means for outputting, in accordance with the configured first time-domain offset, the one or more WUSs and the one or more reference signals.

A non-transitory computer-readable medium storing code for wireless communications is described. The code may include instructions executable by one or more processors to output a first control message indicating a reference signal configuration, the reference signal configuration indicating a reference signal position associated with one or more reference signals, output a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state, and output, in accordance with the configured first time-domain offset, the one or more WUSs and the one or more reference signals.

In some examples of the method, network entities, and non-transitory computer-readable medium described herein, the reference signal position may be before the WUS position in time in accordance with the configured first time-domain offset.

In some examples of the method, network entities, and non-transitory computer-readable medium described herein, the reference signal position may be after the WUS position in time in accordance with the configured first time-domain offset.

In some examples of the method, network entities, and non-transitory computer-readable medium described herein, the reference signal position may be associated with an SMTC and may be after the WUS position in time in accordance with the configured first time-domain offset and the reference signal position may be followed by a data position associated with data.

In some examples of the method, network entities, and non-transitory computer-readable medium described herein, the reference signal position may be after the WUS position in time in accordance with the configured first time-domain offset and the reference signal position at least partially overlaps with a data position associated with data.

Some examples of the method, network entities, and non-transitory computer-readable medium described herein may further include operations, features, means, or instructions for outputting the one or more reference signals and the data in accordance with the configured first time-domain offset, where the one or more reference signals and the data may be time-division multiplexed.

Some examples of the method, network entities, and non-transitory computer-readable medium described herein may further include operations, features, means, or instructions for outputting the one or more reference signals and the data in accordance with the configured first time-domain offset, where the one or more reference signals and the data may be frequency-division multiplexed.

Some examples of the method, network entities, and non-transitory computer-readable medium described herein may further include operations, features, means, or instructions for obtaining a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with a UE, the awake mode the one or more sleep modes, the transitions, or a combination thereof, where the reference signal configuration may be based on the UE capability information.

Some examples of the method, network entities, and non-transitory computer-readable medium described herein may further include operations, features, means, or instructions for determining a duration associated with transitioning to an awake mode from one or more sleep modes, a duration associated with transitioning to the one or more sleep modes from the awake mode, or both, and further determining one or more power consumption parameters associated with the UE, the awake mode, the one or more sleep modes, the transitions, or a combination thereof, where the reference signal configuration may be based on the durations and the one or more power consumption parameters.

In some examples of the method, network entities, and non-transitory computer-readable medium described herein, the reference signal configuration indicates respective time-domain gaps at least before or after the reference signal position during which data may be excluded from transmission.

In some examples of the method, network entities, and non-transitory computer-readable medium described herein, the configured first time-domain offset applies between the reference signal position and a configured ON duration for a DRX mode.

In some examples of the method, network entities, and non-transitory computer-readable medium described herein, the first control message indicates one or more additional reference signal configurations indicating respective reference signal positions associated with one or more additional reference signals that may be periodic or semi-persistent and the configured first time-domain offset applies between reference signal positions of at least one pair of additional reference signals, the one or more reference signals, and the one or more WUSs.

In some examples of the method, network entities, and non-transitory computer-readable medium described herein, the reference signal configuration corresponds to one or more UEs within one or more cells and the WUS configuration corresponds to one or more UEs or a group of UEs, and an additional reference signal configuration corresponds to the UE.

In some examples of the method, network entities, and non-transitory computer-readable medium described herein, the one or more WUSs and the one or more reference signals may be output while the UE may be in an awake mode or one or more sleep modes.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 4 through 8 show examples of relative WUS and reference signal positions that support techniques for relative positioning of WUSs and reference signals in accordance with one or more aspects of the present disclosure.

FIGS. 18 through 22 show flowcharts illustrating methods that support techniques for relative positioning of WUSs and reference signals in accordance with one or more aspects of the present disclosure.

DETAILED DESCRIPTION

Figure 1:
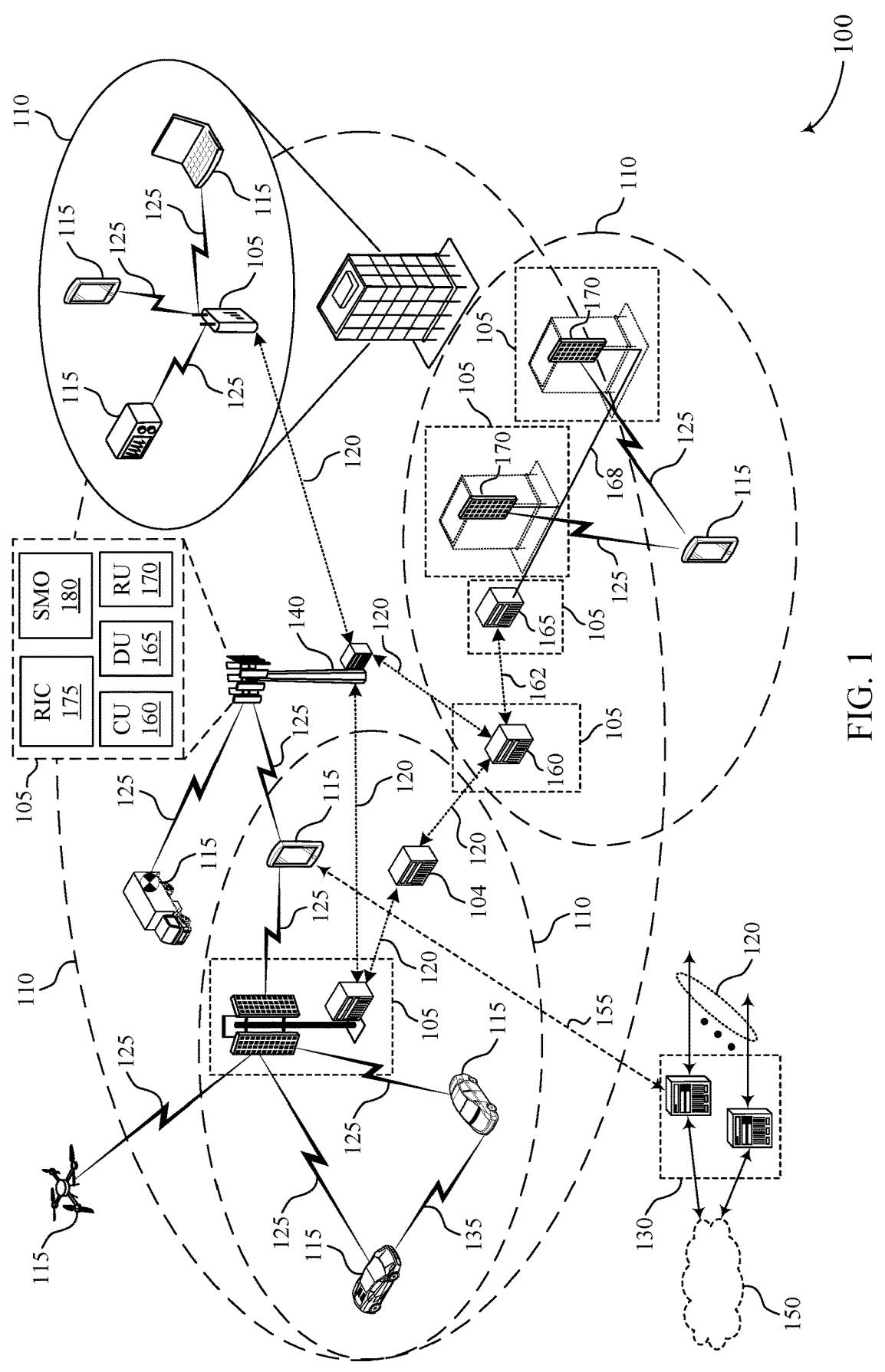
FIG. 1 shows an example of a wireless communications system that supports techniques for relative positioning of wakeup signals (WUSs) and reference signals in accordance with one or more aspects of the present disclosure.

While operating in a connected discontinuous reception (CDRX) mode, a user equipment (UE) may detect a wakeup signal (WUS) (e.g., a wake-up indication) and wake up (e.g., transition from a sleep mode or sleep state to an awake mode or awake state) to monitor for downlink messages from a network entity. In some examples, the UE may wake up based on detecting a WUS during time periods referred to herein as WUS occasions. If the UE fails to detect a WUS, the UE may remain in a sleep mode. Regardless of whether or not the UE detects the WUS, the UE may periodically transition to an awake mode to perform reference signal measurements to maintain a relatively high link quality. For example, the UE may wake up to measure reference signals during time periods referred to herein as reference signal occasions. However, WUS occasions and reference signal occasions may be uncoordinated in position (e.g., in the time domain), and therefore, the UE may wake up randomly (e.g., at random times) and transition between sleep and awake states relatively more often. As transitioning between awake and sleep modes may result in excess power consumption, such uncoordinated wake ups may waste significant amounts of power at the UE.

The techniques described herein may support relative positioning of WUSs and reference signals such that the UE may transition between awake and sleep modes more efficiently. The UE may receive a first control message indicating a reference signal configuration and a second control message indicating a WUS configuration. In some examples, the first control message or the second control message, or both, may be received while the UE operates in the DRX mode. In some other examples, the first control message or the second control message, or both, may be received at other times (e.g., when the UE is not operating in the DRX mode). The reference signal configuration may indicate a position (e.g., a time-domain position) during which the UE may receive one or more reference signals (e.g., a reference signal position associated with one or more reference signals, such as synchronization signal blocks (SSBs)). The WUS configuration may indicate a position in the time domain during which the UE may receive one or more WUSs (e.g., a WUS position). In some examples, the WUS position may be within a first time-domain offset of the reference signal position based on the reference signal configuration. That is, a network entity may configure the WUS position relative to the reference signal position and/or the network entity may configure the reference signal position relative to the WUS position. In addition, the reference signal position may be within a DRX cycle period, where the DRX cycle period may be within a second time-domain offset of the WUS position. The first time-domain offset may be based on one or more durations associated with the UE transitioning from an active state to a sleep mode (e.g., entering a sleep mode). The UE may monitor for the one or more WUSs and the one or more reference signals in accordance with the first time-domain offset. It should be noted that the techniques described herein may apply to other DRX modes in addition to a CDRX mode, including an idle DRX mode, an enhanced DRX mode, or the like. Thus, although WUS, reference signal, and data reception are described in examples herein while the UE operates in a connected mode (e.g., a CDRX mode), examples of WUS, reference signal, and data reception may also occur while the UE operates in an inactive mode, an idle mode, or the like.

Aspects of the disclosure are initially described in the context of wireless communications systems. Aspects of the present disclosure are then described in the context of relative WUS and reference signal positions and process flows. Aspects of the disclosure are further illustrated by and described with reference to apparatus diagrams, system diagrams, and flowcharts that relate to techniques for relative positioning of WUSs and reference signals.

FIG. 1 shows an example of a wireless communications system 100 that supports techniques for relative positioning of WUSs and reference signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for relative positioning of wakeup signals and reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a UE 115 may monitor a wireless link 125 continuously for an indication that the UE 115 may receive data. In other cases (e.g., to conserve power and extend battery life) a UE 115 may be configured with a DRX cycle. A DRX cycle consists of an "ON Duration" when the UE 115 may monitor for control information (e.g., via a physical downlink control channel (PDCCH)) or receive data (e.g., via a physical downlink control channel (PDSCH)) and a "DRX period" when the UE 115 may power down radio components. The "ON Duration" may also be referred to herein as a DRX Active duration or a DRX ON duration. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a network entity 105. A UE 115 may receive scheduling messages on PDCCH during the ON Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

In some implementations, a UE 115 may monitor for WUSs (which may be referred to as wake-up indications, a wake-up indication bit, one or more wake-up indication bits, or the like) while in a DRX mode (e.g., a CDRX mode). If the UE 115 detects a WUS, the UE 115 may wake up (e.g., transition from a sleep mode to an awake mode) and begin monitoring for downlink transmissions (e.g., PDCCH, PDSCH) for a minimum period equal to a DRX ON$_{min}$ duration (e.g., a minimum duration that a UE monitors). Based on receiving control or data messages from the network entity 105, the UE 115 may extend how long it monitors for the downlink transmissions beyond a minimum period to a longer period equal to the DRX ON Duration (e.g., the DRX Active duration). Thus, the actual monitoring duration of the UE 115, the DRX ON duration (e.g., the DRX Active duration), may be equal to or larger than the DRX ON$_{min}$ duration. The timing of the WUS may correspond to a DRX cycle (e.g., the UE 115 may monitor for a WUS immediately before the beginning of a DRX cycle or period, for example, with an 80 ms periodicity). If the UE 115 fails to detect a WUS (e.g., a failure to receive the WUS), the UE 115 may remain in the sleep mode. However, whether or not the UE 115 receives a WUS, the UE may wake up periodically to measure reference signals (e.g., SSBs) to maintain a high link quality. For example, the UE 115 may wake up to monitor high-quality SSB beams and maintain a time and frequency lock with the network entity 105. The UE 115 may wake up to monitor for reference signals according to different periodicities for various purposes.

However, the UE 115 may wake up randomly if WUS occasions (e.g., time periods during which the UE 115 may detect a WUS and wake up) and reference signal occasions (e.g., time periods during which the UE 115 may wake up to perform reference signal measurements) are uncoordinated (e.g., configured separately). Uncoordinated wakeups may lead to significant power waste during ramps between sleep modes (e.g., sleep states) and awake modes (e.g., sleep states). Specifically, SSB and WUS-related wakeups may be dominant sources of power consumption for a UE 115 when there is low traffic (e.g., where low or no traffic periods may occur even for a connected UE 115, for example in Instant Messaging, hence, why the network entity 105 may configure DRX). For example, ramp-up and ramp-down energy (e.g., energy the UE 115 may consume when ramping up from a sleep mode to an awake mode or ramping down from an awake mode to a sleep mode, respectively) may be a significant component of the UE's energy consumption in no traffic periods. As higher frequency bands (e.g., frequency range 2 (FR2)) may be associated with relatively shorter DRX cycles and relatively more frequent SSB monitoring than lower frequency bands (e.g., frequency range 1 (FR1)), such energy consumption and overhead may be worse in higher frequency bands.

In some examples, the UE 115 may measure synchronization signal (SS)/physical broadcast channel (PBCH) blocks (SSBs) during a reference signal occasion from a serving cell of the UE 115 and one or more neighbor cells of the UE 115. SSB bursts (e.g., including up to 64 SSBs) may be aligned across cells by SFN. The network entity 105 may configure an SSB measurement timing configuration (SMTC) window, which may overlap with at least a fraction of the SSB bursts (or every SSB burst), where the UE 115 may perform and report SSB measurements associated with the serving cell and the one or more neighbor cells. In some examples, the UE 115 may search for new cells or beams and measure detected "good" beams with new receive beams during one or more SMTC occasions (e.g., a type of reference signal occasion) rather than non-SMTC occasions as the non-SMTC occasions may include frequency division multiplexed (FDMed) data. The UE 115 may perform SSB measurements during an SSB burst, whether or not the SSB burst overlaps or coincides with an SMTC occasion.

The wireless communications system 100 may support techniques for relative positioning of WUS occasions and reference signal occasions to reduce unnecessary wakeups at the UE 115 and thus, reduce power consumption. The UE 115 may receive a first control message indicating a reference signal configuration and a second control message indicating a WUS configuration. The reference signal configuration may indicate a position during which the UE 115 may receive one or more reference signals (e.g., a reference signal position associated with one or more reference signals, such as SSBs). The WUS configuration may indicate a position in time during which the UE 115 may receive one or more WUSs (e.g., a WUS position). In some examples, the WUS position may be within a first time-domain offset of the reference signal position based on the reference signal configuration. In addition, the reference signal position may be within a DRX cycle period that is within a second time-domain offset of the WUS position. The first time-domain offset may be based on one or more durations associated with the UE 115 transitioning from an active state to a sleep mode (e.g., entering a sleep mode). The UE 115 may monitor for the one or more WUSs and the one or more reference signals in accordance with the first time-domain offset.

Figure 2:
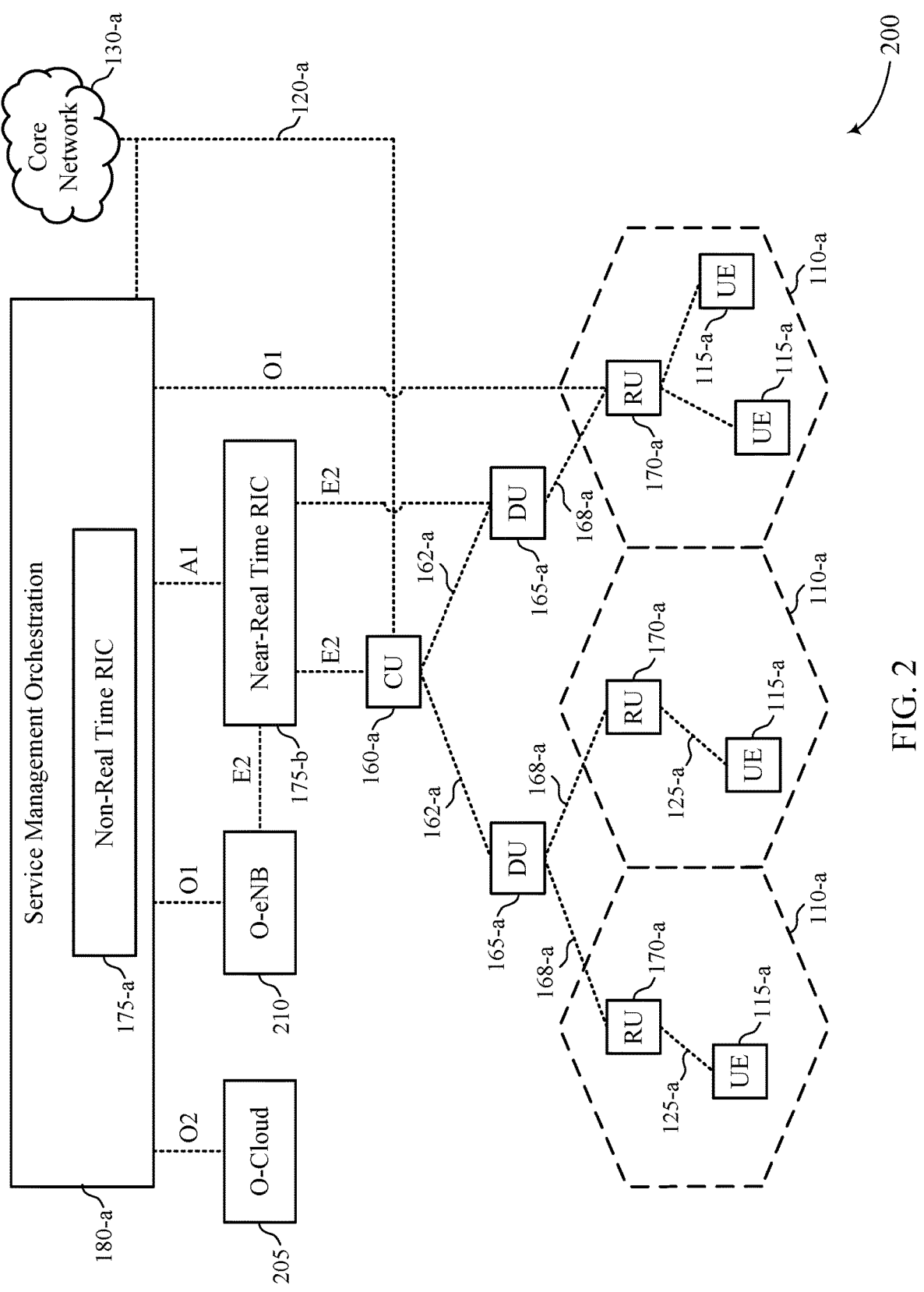
FIG. 2 shows an example of a network architecture that supports techniques for relative positioning of WUSs and reference signals in accordance with one or more aspects of the present disclosure.

FIG. 2 shows an example of a network architecture 200 (e.g., a disaggregated base station architecture, a disaggregated RAN architecture) that supports techniques for relative positioning of WUSs and reference signals in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

The network architecture 200 may support techniques for relative positioning of WUS occasions and reference signal occasions to reduce unnecessary wakeups at the UE 115-*a* and thus, reduce power consumption. While the UE 115-*a* operates in a DRX mode, the UE 115-*a* may receive a first control message indicating a reference signal configuration and a second control message indicating a WUS configuration. The reference signal configuration may indicate a position at which the UE 115-*a* may receive one or more reference signals (e.g., a reference signal position associated with one or more reference signals, such as SSBs). The WUS configuration may indicate a position in time during which the UE 115-*a* may receive one or more WUSs (e.g., a WUS position). In some examples, the WUS position may be within a first time-domain offset of the reference signal position based on the reference signal configuration. In addition, the reference signal position may be within a DRX cycle period within a second time-domain offset of the WUS position. The first time-domain offset may be based on one or more durations associated with the UE 115-*a* transitioning from an active state to a sleep mode (e.g., entering a sleep mode). The UE 115-*a* may monitor for the one or more WUSs and the one or more reference signals in accordance with the first time-domain offset.

Figure 3:
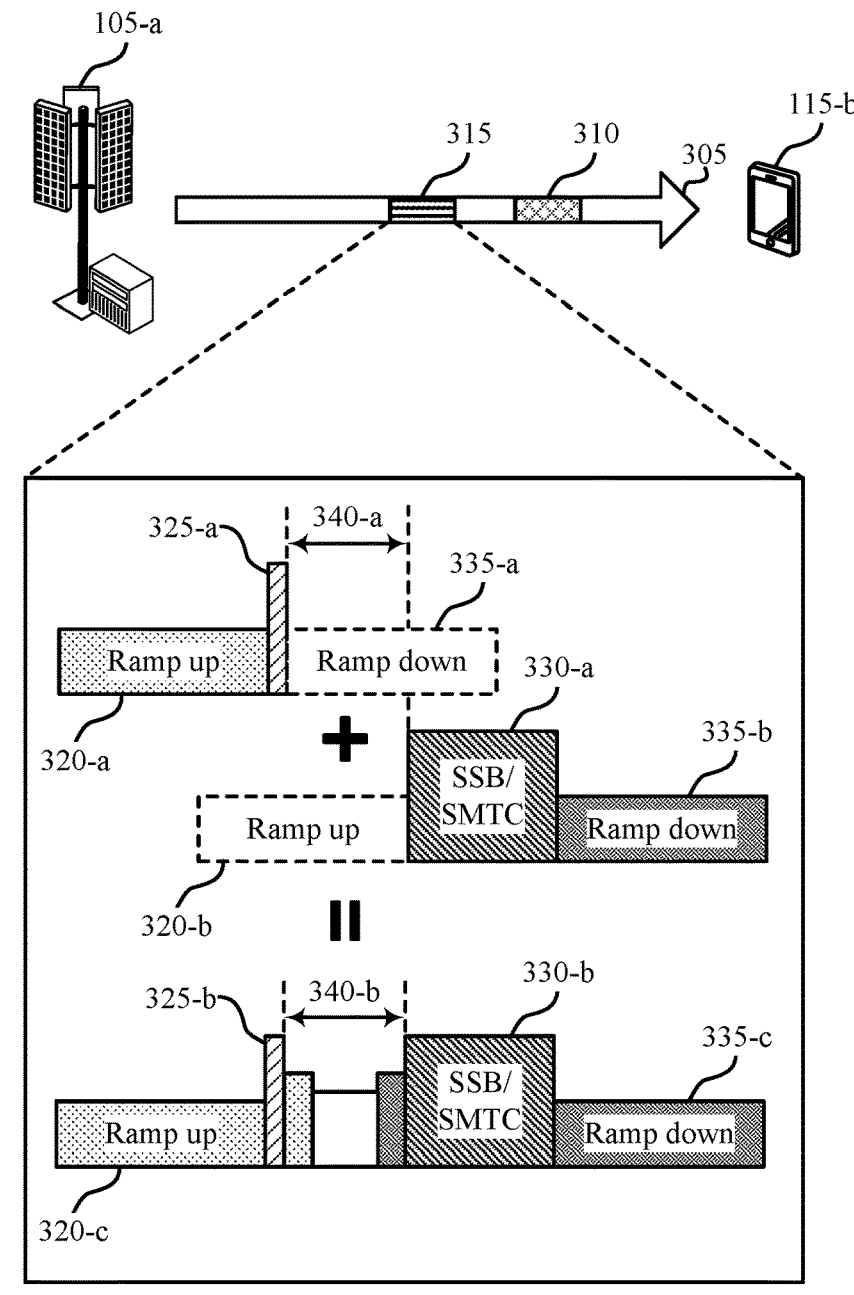
FIG. 3 shows an example of a wireless communications system that supports techniques for relative positioning of WUSs and reference signals in accordance with one or more aspects of the present disclosure.
Figure 3:
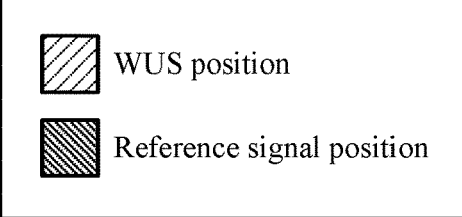

FIG. 3 shows an example of a wireless communications system 300 that supports techniques for relative positioning of WUSs and reference signals in accordance with one or more aspects of the present disclosure. In some examples, the wireless communications system 300 may implement aspects of the wireless communications system 100 and the network architecture 200 or may be implemented by aspects of the wireless communications system 100 and the network architecture 200. For example, the wireless communications system 300 may include a UE 115-*b* and a network entity 105-*a*, which may be examples of corresponding devices described herein. In some examples, the UE 115-*b* and the network entity 105-*a* may communicate via a wireless communication link 305, which may be an example of a communication link 125 described herein with reference to FIG. 1.

The UE 115-*b* may operate in a DRX mode (e.g., which may be configured by the network entity 105-*a*). In cases where the UE 115-*b* operates in a sleep mode, the UE 115-*b* may wake up based on detecting a WUS 325 from the network entity 105-*a* and may occasionally wake up to perform reference signal measurements (e.g., to maintain a particular link quality). In some examples, the UE 115 may receive a control message 310 from the network entity 105-*a* indicating a reference signal configuration. In some examples, the control message 310 may be received while the UE 115 is operating in the DRX mode (e.g., CDRX mode). The reference signal configuration may indicate a reference signal position associated with one or more reference signals 330 (e.g., SSBs, associated with an SMTC), where there reference signal position may be a period of time during which the UE 115 may receive the one or more reference signals 330.

The UE 115-*b* may receive a control message 315 from the network entity 105-*a* indicating a WUS configuration. The WUS configuration may indicate a WUS position associated with one or more WUSs 325, where the WUS position may be a period of time during which the UE 115 may detect the one or more WUSs 325. In addition, the WUS position may be within a configured time-domain offset 340-*a* of the reference signal position according to the reference signal configuration. For example, the UE 115-*b* may transition from a sleep mode (e.g., a sleep state) to an awake mode (e.g., an awake state) during a ramp up 320-*a*. The ramp up 320-*a* (and a ramp down 335) may be hardware-dependent, and may correspond to powering up/powering down one or more radio chains and/or RF components described herein. The network entity 105-*a* may position a WUS 325-*a* and a reference signal 330-*a* (e.g., an SSB burst) with an offset 340-*a* that is small enough such that the UE's ramp down 335-*a* (to the sleep mode from the awake mode) associated with the WUS 325-*a* at least partially overlaps with a ramp up 320-*b* (to the awake mode from the sleep mode) associated with the reference signal 330-*a*. The reference signal position may be within a DRX cycle period that is within a configured second time-domain offset of the WUS position, where the offset 340-*a* is based on the ramp up 320-*b* or the ramp down 335-*a* (e.g., one or more durations associated with the UE 115-*b* transitioning from an active state to a sleep mode). The UE 115-*b* may then transition back to a sleep mode after receiving the reference signal 330-*a* during a ramp down 335-*b*.

As such, when put together, the UE 115-*b* may transition to an awake mode during a ramp up 320-*c* and receive a WUS 325-*b* during a WUS position. The WUS position may be within an offset 340-*b* (e.g., a relatively small offset in the time domain) of a reference signal position according to the reference signal configuration. In some examples, the offset 340-*b* may be associated with beam switching (e.g., a beam switching time up to one symbol or one slot). During the offset 340-*b*, the UE 115-*b* may refrain from fully ramping down and up and instead may operate in an intermediate power state while the WUS position transitions into the reference signal position. That is, the UE 115-*b* may absorb beam switching durations during the offset 340-*b*. In some examples, during the offset 340-*b*, the UE 115-*b* may enter a micro-sleep mode, which may be a reduced power state but not a full sleep mode (e.g., thus reducing ramp time). The UE 115-*b* may monitor for the WUS 325-*b* and a reference signal 330-*b* in accordance with the offset 340-*b* and after receiving the reference signal 330-*b*, transition back to a sleep mode during a ramp down 335-*c*. By operating in the intermediate power state during the offset 340-*b*, the UE 115-*b* may save ramp time and thus save power.

In some examples, different network scenarios and different UEs 115 may result in different power savings. For example, as described herein with reference to FIGS. 3 through 7, different WUS positions and relative reference signal positions may result in different configurations and thus, different power savings. In some implementations, the network entity 105-*a* may reduce or increase the offset 340-*b* between a WUS 325 and a reference signal 330. In some examples, the network entity 105-*a* may optimize either an SMTC window position (e.g., specific SSB bursts) or a non-SMTC SSB burst position (e.g., a reference signal position). Additionally, the network entity 105-*a* may configure ramp ups 320 and ramp downs 335 to at least partially overlap and may configure the positions of a DRX ON duration and one or more reference signals 330 to at least partially or fully overlap. Such configurations may result in additional power savings and may reduce latency.

To determine different configurations of the WUS position and the reference signal position, the network entity 105-*a* may use some pre-defined ramp durations (e.g., transition durations) and power consumptions (e.g., power consumption parameters) for the UE 115-*b*, or the UE 115-*b* may transmit capability information to the network entity 105-*a*. In some implementations, the network entity 105-*a* may request that the UE 115-*b* report its typical ramp durations and power consumptions (e.g., as actual values, quantized values, etc.). For example, the capability information may indicate a duration associated with the UE 115-*b* transitioning to an awake mode from one or more sleep modes (e.g., a full sleep mode or a micro-sleep mode), a duration associated with the UE 115-*b* transitioning to the one or more sleep modes from the awake mode, or both. Additionally, the capability information may indicate one or more power consumption parameters associated with the UE 115-*b*, the awake mode, the one or more sleep modes, the transitions (between the sleep and awake modes), or a combination thereof. Based on the capability information of the UE 115-*b*, the network entity 105-*a* may configure the reference signal configuration. That is, the duration of the offset 340-*b* may be based on the capability of the UE 115-*b*. The network entity 105-*a* may utilize the information about the power consumption of the UE 115-*b* in different states (e.g., active or sleep modes) to estimate the power reduction achieved by the UE 115-*b* in different configurations. Thus, the network entity 105-*a* may select a configuration that is optimal given a current power requirement of the UE 115-*b*, network scheduling constraints, and other system parameters.

In some examples, the network entity 105-*a* may determine or assume particular ramp durations and power consumptions associated with the UE 115-*b* without explicitly requesting or obtaining the capability information from the UE 115-*b*. For example, the network entity 105-*a* may determine the durations associated with the UE 115-*b* ramping up and ramping down between sleep modes and an awake mode. In addition, the network entity 105-*a* may determine the one or more power consumption parameters based on pre-defined values (e.g., specifications) or based on a type of UE 115-*b* (e.g., low-tier, mid-tier, high-tier, IoT, and the like).

Figure 4:
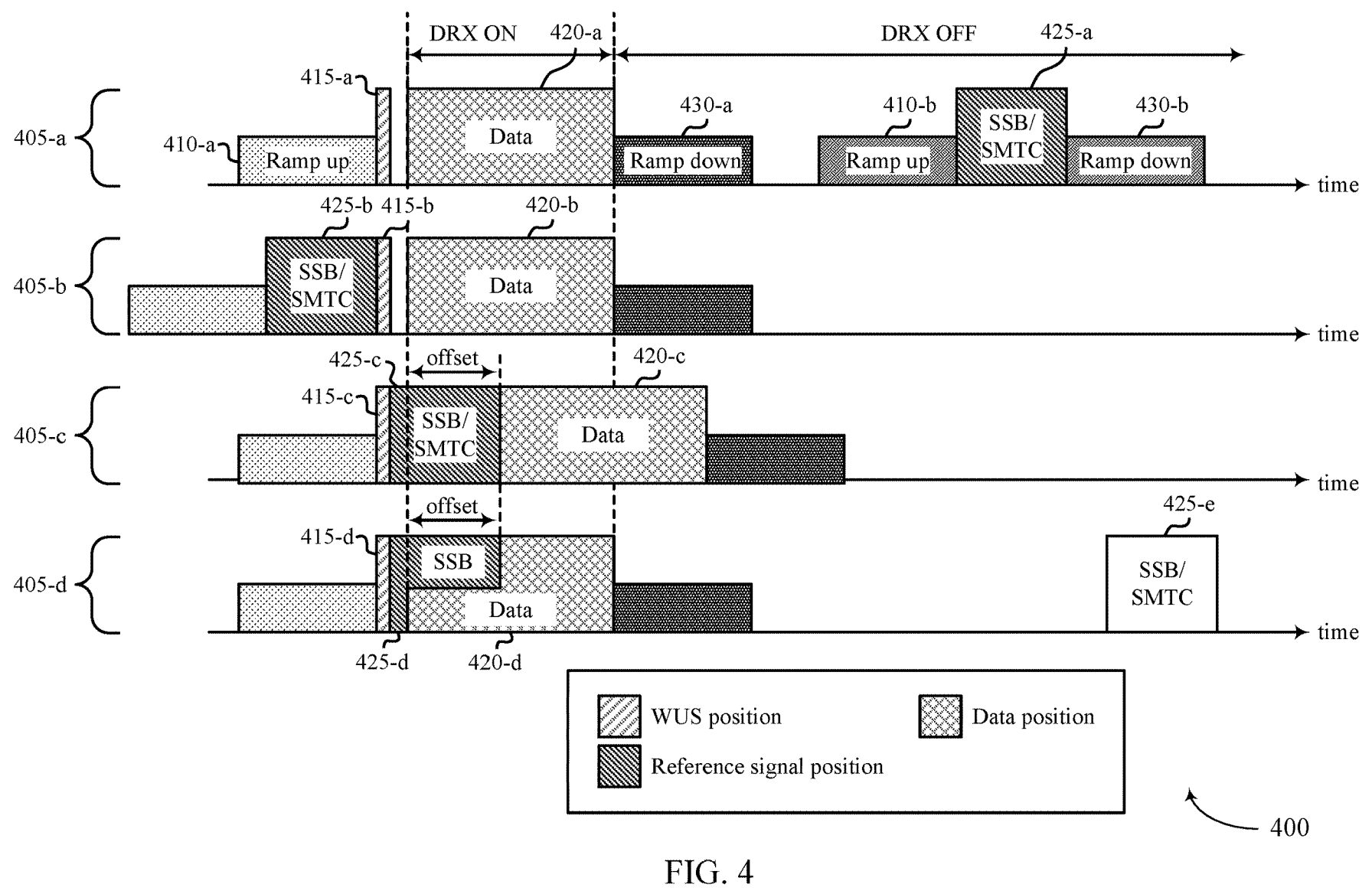

FIG. 4 shows an example of relative WUS and reference signal positions 400 that support techniques for relative positioning of WUSs and reference signals in accordance with one or more aspects of the present disclosure. In some examples, the relative WUS and reference signal positions 400 may implement aspects of the wireless communications system 100 and the network architecture 200 or may be implemented by aspects of the wireless communications system 100 and the network architecture 200. For example, a network entity 105 may configure the relative WUS and reference signal positions 400 for the UE 115 regarding communications of WUSs 415 and reference signals 425. In some examples, the network entity 105-*a* may configure configurations 405-*a*, 405-*b*, 405-*c*, and 405-*d*, which each may include relative WUS, reference signal, and data positions.

The configuration 405-*a* may depict a WUS position, a reference signal position, and a data position based on a random offset. The UE 115 may transition to an awake mode from a sleep mode during a ramp up 410-*a* and detect a WUS 415-*a* from the network entity 105. The ramp up 410-*a* and the WUS 415-*a* may occur during the WUS position. In some examples, there may be a small gap between detection of the WUS 415-*a* and a beginning of a DRX ON duration as the UE 115 may not be fully awake to receive data when it detects the WUS 415-*a*. During this short gap, the UE 115 may enter a micro-sleep mode or a similar state such that it has time to fully wake up before performing a data transmission or reception.

During the DRX ON duration, the UE 115 may receive data 420-*a* during a data position. After the data transmission, the UE 115 may transition to a sleep mode during a ramp down 430-*a*. The ramp down 430-*a* may occur during a DRX OFF duration, which may begin at the conclusion of the data transmission. As such, the UE 115 may fully wake up and go to sleep during the WUS position and the data position. At a later time during the DRX OFF duration, the UE 115 may again transition to an awake mode from the sleep mode during a ramp up 410-*b* to measure a reference signal 425-*a* (e.g., an SSB, an SMTC, an SSB burst). For example, the UE 115 may periodically wake up to measure reference signals 425 regardless of whether it detected the WUS 415-*a*. The UE 115 may transition to a sleep mode during a ramp down 430-*b* after measuring the reference signal 425-*a*. As such, the UE 115 may again fully transition between sleep and awake modes, which may increase ramp time and power consumption for the UE 115.

To reduce the ramp time and overall power consumption for the UE 115, the network entity 105-*a* may instead configure the configurations 405-*b*, 405-*c*, or 405-*d*. As described herein with reference to FIG. 3, while operating in a DRX mode, the UE 115 may receive a first control message indicating a reference signal configuration, the reference signal configuration indicating a reference signal position associated with reference signals 425. The UE 115 may receive a second control message indicating a WUS configuration, the WUS configuration indicating a WUS position associated with one or more WUSs 415. In addition, the WUS position may be within a first time-domain offset of the reference signal position.

In the configuration 405-*b*, the reference signal position may be before the WUS position in time according to the first offset. As such, the UE 115 may receive a reference signal 425-*b* in a reference signal position prior to monitoring for a WUS 415-*b* during a WUS position. The network entity 105 may use the configuration 405-*b* when the WUS 415-*b* is mostly set (e.g., in relatively high-traffic cases) as it may save extra ramp up time after the UE 115 detects the WUS 415-_b_. The UE 115 may determine (e.g., identify) the reference signal position from the first and second control messages such that the UE 115 may wake up prior to detecting the WUS 415-_b_ to monitor for and measure the reference signal 425-_b_. In some examples, there may be a relatively small offset (such as the offset 340-_b_ described herein with reference to FIG. 3) between the reference signal 425-_b_ and the WUS 415-_b_. For example, instead of fully transitioning back to a sleep mode after measuring the reference signal 425-_b_, the UE 115 may enter some intermediate power mode (e.g., a micro-sleep mode) during the offset until the UE 115 detects the WUS 415-_b_. In some examples, the WUS position may be followed by a relatively small gap (during which the UE 115 may take the time to fully ramp up to an awake mode from a sleep mode) and a data position during which the UE 115 may receive data 420-_b_.

Alternatively, in the configuration 405-_c_, the network entity 105 may configure the reference signal position to be after the WUS position according to the first time-domain offset. In some implementations, the reference signal position may be associated with an SMTC and may be followed by a delayed data position. For example, the UE 115 may detect a WUS 415-_c_ and ramp up to an awake mode from a sleep mode during the WUS position. After the WUS position, the UE 115 may monitor for a reference signal 425-_c_, which may be an SSB or associated with an SMTC (e.g., associated with SSB bursts), during a reference signal position. The UE 115 may periodically wake up to monitor for the reference signal 425-_c_ regardless of whether the UE 115 detects the WUS 415-_c_. If the UE 115 fails to detect the WUS 415-_c_ during the WUS position, the UE 115 may refrain from monitoring for the reference signal 425-_c_ and return to a sleep mode (e.g., the UE 115 may skip an SSB or SMTC measurement if it fails to detect the WUS 415-_c_). Instead of a data position coinciding with the beginning of the DRX ON duration, the data position may be offset from the beginning of the DRX ON duration (e.g., by a time delay ta) based on the reference signal position immediately following the WUS position. The UE 115 may receive data 420-_c_ during the offset data position following the reference signal position. In some examples, the network entity 105 may delay the data 420-_c_ based on the reference signal 425-_c_ coinciding with an SMTC window. The data position may be delayed by the network entity 105 to allow the UE 115 to measure SSBs during the SMTC with a beam independent from that used to receive the data transmission. The network entity 105 may use the configuration 405-_c_ in cases where the WUS 415-_a_ may be mostly absent (e.g., in low-traffic cases). For example, in low-traffic scenarios, the UE 115 may perform reference signal (e.g., SSB) measurements for time/frequency loop update, network-side transmit beam searching, or UE-side receive beam updating at times close to when data may be scheduled. Additionally, because an SMTC window may at least partially overlap with the DRX ON duration, the network entity 105 may delay the data transmission until after the SMTC window to ensure that the UE 115 is able to perform an error-free reference signal measurement (e.g., saving extra ramp up time for the reference signal 425-_c_).

Alternatively, in the configuration 405-_d_, the network entity 105 may configure the reference signal position to be after the WUS position according to the first time-domain offset (e.g., a time offset) and with parallel or FDMed data processing. For example, the UE 115 may detect a WUS 415-_d_ and subsequently ramp up to an awake mode from a sleep mode during the WUS position. After the WUS position, the UE 115 may receive a reference signal 425-_d_ during a reference signal position. The configuration 405-_d_ may support parallel SSB and data processing such that a data position may at least partially overlap with the reference signal position during a DRX ON duration. That is, the UE 115 may receive the reference signal 425-_d_ which may be time division multiplexed (TDMed) or FDMed with data 420-_d_. Because the reference signal 425-_d_ (e.g., an SSB) is multiplexed with the data 420-_d_, the UE 115 may refrain from performing any beam sweeping to ensure it accurately receives the data 420-_d_. Therefore, the reference signal 425-_d_ may not be associated with an SMTC window. The UE 115 may receive and measure a reference signal 425-_e_ at a later time, where the reference signal 425-_e_ may be associated with an SSB burst or an SMTC window. The UE 115 may wake up to monitor an SMTC window according to a periodicity greater than a periodicity according to which the UE 115 may monitor for SSBs. The network entity 105 may use the configuration 405-_d_ in cases where the reference signal 425-_d_ (e.g., a serving SSB) and data may be received on a same beam and hence, FDMed, where the reference signal 425-_e_ (e.g., the SMTC window) is already configured. This may additionally save extra ramp up time for the reference signal 425-_d_. The amount of power a UE 115 saves using the configurations 405-_b_, 405-_c_, and 405-_d_ may depend on whether data 420 is present.

Figure 5:
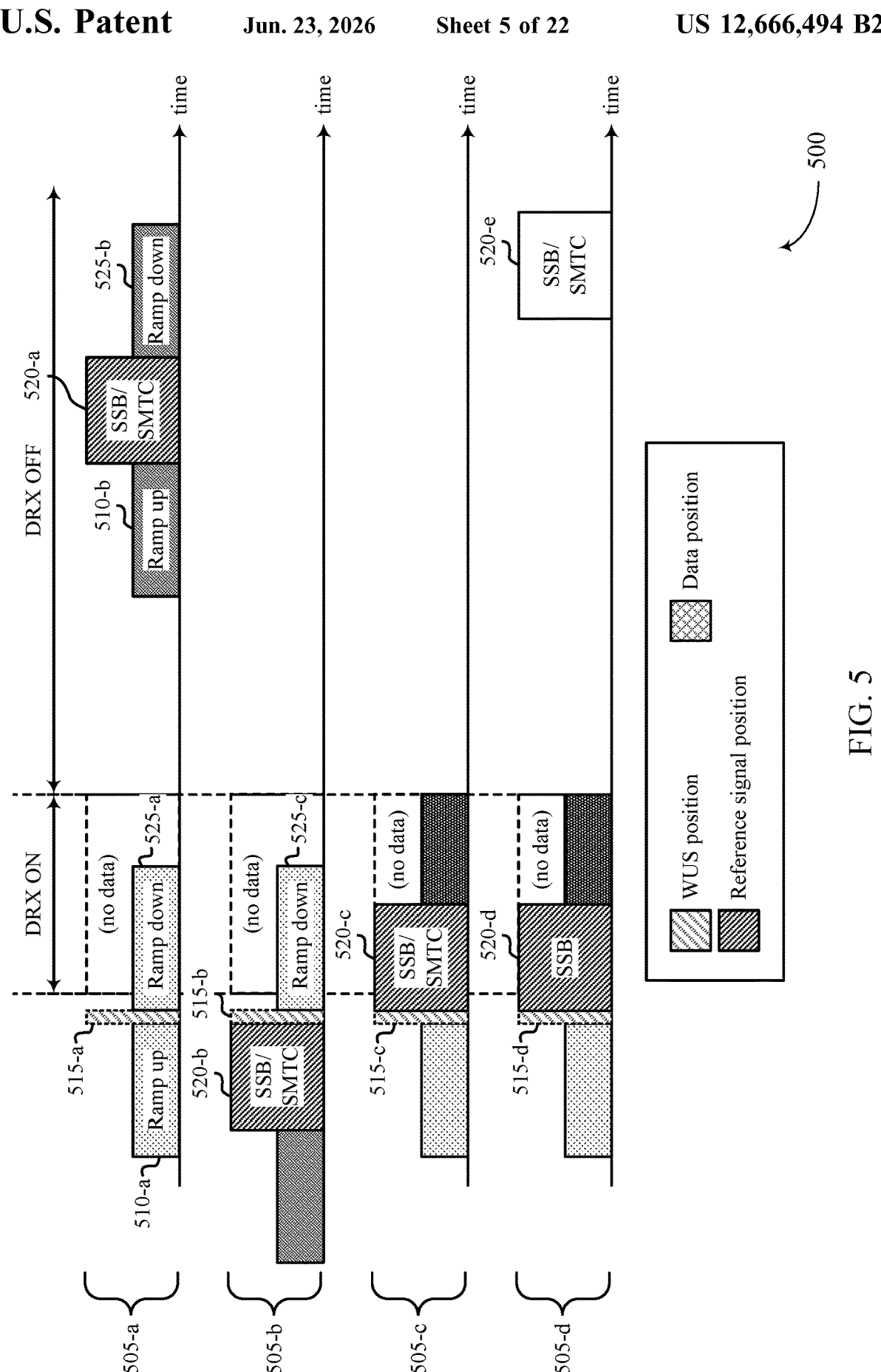

FIG. 5 shows an example of relative WUS and reference signal positions 500 that support techniques for relative positioning of WUSs and reference signals in accordance with one or more aspects of the present disclosure. In some examples, the relative WUS and reference signal positions 500 may implement aspects of the wireless communications system 100 and the network architecture 200 or may be implemented by aspects of the wireless communications system 100 and the network architecture 200. For example, a network entity 105 may configure the relative WUS and reference signal positions 500 for the UE 115 regarding communications of WUSs 515 and reference signals 520. In some examples, the network entity 105-_a_ may configure configurations 505-_a_, 505-_b_, 505-_c_, and 505-_d_, which each may include relative WUS and reference signal positions. The configurations 505-_a_, 505-_b_, 505-_c_, and 505-_d_ may correspond to the configurations 405-_a_, 405-_b_, 405-_c_, and 405-_d_, respectively, however may depict the scenario where data is not present (e.g., because a WUS 515 is not set).

The configuration 505-_a_ may depict a WUS position, a reference signal position, and a data position based on a random offset. The UE 115 may transition to an awake mode from a sleep mode during a ramp up 510-_a_ to monitor for a WUS 515-_a_. The ramp up 510-_a_ and the WUS 515-_a_ monitoring may occur during a WUS position. However, the UE 115 may fail to detect the WUS 515-_a_ (e.g., the network entity 105 may fail to transmit the WUS 515-_a_). Based on failing to detect the WUS 515-_a_, the UE 115 may transition back to a sleep mode during a ramp down 525-_a_, where the ramp down 525-_a_ may coincide with the beginning of a DRX ON duration. As no WUS 515-_a_ was set, there may be a lack of a data transmission and corresponding data position.

The UE 115 may wake up at a later time (e.g., during a DRX OFF duration) to periodically monitor for and measure a reference signal 520-_a_. For example, the UE 115 may periodically transition to an awake mode from a sleep mode during a ramp up 510-_b_ to measure the reference signal 520-_a_ (e.g., an SSB, an SMTC, an SSB burst) regardless of whether it detected the WUS 515-_a_. The UE 115 may transition back to the sleep mode during a ramp down 525-*b* after measuring the reference signal 520-*a*. As such, the UE 115 may again fully transition between sleep and awake modes, which may increase ramp time and power consumption for the UE 115 despite any data transmission occurring.

To reduce the ramp time and overall power consumption for the UE 115, the network entity 105-*a* may instead configure the configurations 505-*b*, 505-*c*, or 505-*d*. As described herein with reference to FIGS. 2 and 3, while operating in a DRX mode, the UE 115 may receive a first control message indicating a reference signal configuration, the reference signal configuration indicating a reference signal position associated with reference signals 520. The UE 115 may receive a second control message indicating a WUS configuration, the WUS configuration indicating a WUS position associated with one or more WUSs 515. In addition, the WUS position may be within a first time-domain offset of the reference signal position.

In the configuration 505-*b*, which may be a variation of the configuration 405-*b* described herein with reference to FIG. 4, the reference signal position may be before the WUS position in time according to the first offset. As such, the UE 115 may receive a reference signal 520-*b* in a reference signal position prior to monitoring for a WUS 515-*b* during a WUS position. The network entity 105 may use the configuration 505-*b* when the WUS 515-*b* is mostly set (e.g., in relatively high-traffic cases). The UE 115 may determine (e.g., identify, know) the reference signal position from the first and second control messages such that the UE 115 may wake up prior to the WUS position such that the UE 115 may monitor for and measure the reference signal 520-*b*. In some examples, the UE 115 may fail to detect the WUS 515-*b* (e.g., the WUS 515-*b* may not be set). As such, the UE 115 may transition back to a sleep date during a ramp down 525-*c*, which may occur during a DRX ON duration and the WUS position. As the UE 115 failed to detect a WUS 515-*b*, there may be no data transmitted to the UE 115, and the UE 115 may remain in a sleep mode.

Alternatively, in the configuration 505-*c*, which may be a variation of the configuration 405-*c* described herein with reference to FIG. 4, the network entity 105 may configure the reference signal position to be after the WUS position according to the first time-domain offset. In some implementations, the reference signal position may be associated with an SMTC and may be followed by a delayed data position. For example, the UE 115 may begin to ramp up from a sleep mode to an awake mode to monitor for a WUS 515-*c* during the WUS position. However, the UE 115 may refrain from detecting the WUS 515-*c* (e.g., the WUS 515-*c* may not be set). After the WUS position, the UE 115 may monitor for a reference signal 520-*c*, which may be an SSB or associated with an SMTC (e.g., associated with SSB bursts), during a reference signal position. The UE 115 may periodically wake up to monitor for the reference signal 520-*c* regardless of whether it detects the WUS 515-*c*.

Alternatively, based on the UE 115 failing to detect WUS 515-*c* during the WUS position, the UE 115 may refrain from monitoring for the reference signal 520-*c* and return to a sleep mode (e.g., the UE 115 may skip an SSB or SMTC measurement if it fails to detect the WUS 515-*c*). Instead of a data position coinciding with the beginning of the DRX ON duration, the data position may be offset from the beginning of the DRX ON duration (e.g., by a time delay ta) based on the reference signal position immediately following the WUS position. However, because the UE 115 failed to detect the WUS 515-*c*, the UE 115 may fail to receive any data after the reference signal position, and the UE 115 may return to the sleep mode following measurement of the reference signal 520-*c*. The network entity 105 may use the configuration 505-*c* in cases where a WUS 515 may be mostly absent (e.g., low traffic cases). For example, in relatively low traffic scenarios, the UE 115 may perform reference signal (e.g., SSB) measurements for updating time/frequency loops, network-side transmit beam searching, or UE-side receive beam updating at times close to when data may be scheduled. Additionally, because an SMTC window may at least partially overlap with the DRX ON duration, the network entity 105 may delay the data transmission until after the SMTC window to ensure the UE 115 is able to perform an error-free reference signal measurement (e.g., saving extra ramp up time for the reference signal 520-*c*).

Alternatively, in the configuration 505-*d*, which may be a variation of the configuration 405-*d* described herein with reference to FIG. 4, the network entity 105 may configure the reference signal position to be after the WUS position according to the first time-domain offset and with parallel or FDMed data processing. For example, the UE 115 may begin to ramp up from a sleep mode to an awake mode to monitor for a WUS 515-*d* during the WUS position. However, the UE 115 may refrain from detecting the WUS 515-*d* (e.g., the WUS 515-*d* may not be set). After the WUS position, the UE 115 may monitor for a reference signal 520-*d*, which may be an SSB, during a reference signal position. The UE 115 may periodically wake up to monitor for the reference signal 520-*d* regardless of whether it detects the WUS 515-*d*. Alternatively, based on the UE 115 failing to detect the WUS 515-*d* during the WUS position, the UE 115 may refrain from monitoring for the reference signal 520-*d* and return to a sleep mode (e.g., the UE 115 may skip an SSB or SMTC measurement if the UE 115 fails to detect the WUS 515-*d*).

The configuration 505-*d* may support parallel SSB and data processing such that a data position may at least partially overlap with the reference signal position during a DRX ON duration. However, because the UE 115 failed to detect the WUS 515-*d*, there may no data transmission to be multiplexed with the reference signal 520-*b*. Because the reference signal 520-*d* (e.g., an SSB) may have been multiplexed with data had the UE 115 detected the WUS 515-*d*, the UE 115 may refrain from performing any beam sweeping to prioritize a data transmission. Therefore, the reference signal 520-*d* may not be associated with an SMTC window. The UE 115 may receive and measure a reference signal 520-*e* at a later time, where the reference signal 520-*e* may be associated with an SSB burst or an SMTC window. The UE 115 may wake up to monitor an SMTC window according to a periodicity greater than a periodicity according to which the UE 115 may monitor for SSBs. The network entity 105 may use the configuration 505-*d* in cases where the reference signal 520-*d* (e.g., a serving SSB) and data may be received on a same beam and hence, FDMed, where the reference signal 520-*e* (e.g., the SMTC window) is already configured. This may additionally save extra ramp up time for the reference signal 520-*d*, thereby improving efficiency and power consumption of the UE 115.

Figure 6:
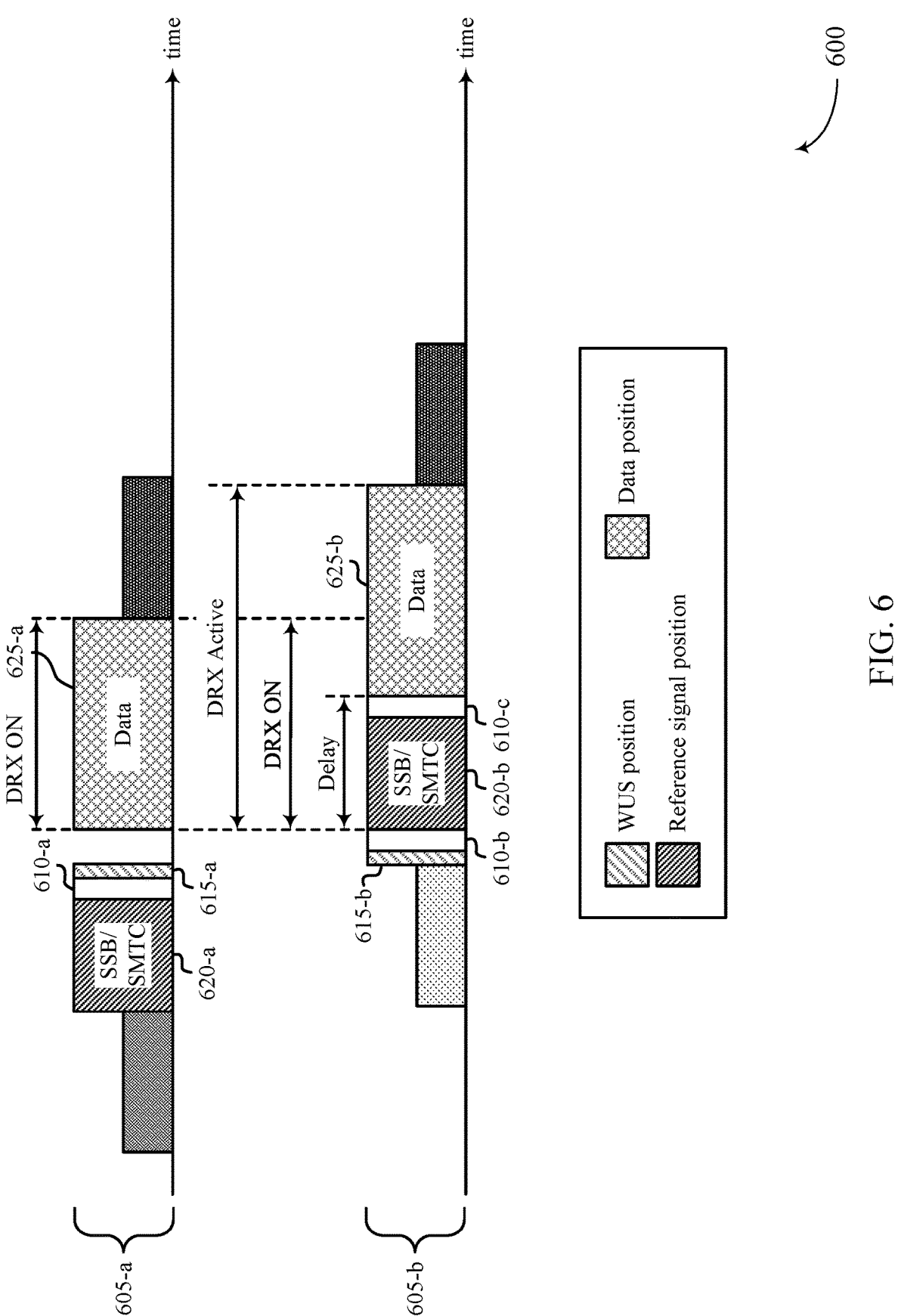

FIG. 6 shows an example of relative WUS and reference signal positions 600 that support techniques for relative positioning of WUSs and reference signals in accordance with one or more aspects of the present disclosure. In some examples, the relative WUS and reference signal positions 600 may implement aspects of the wireless communications system 100 and the network architecture 200 and the relative WUS and reference signal positions 400 and 500 or may be implemented by aspects of the wireless communications system 100 and the network architecture 200 and the relative WUS and reference signal positions 400 and 500. For example, a network entity 105 may configure the relative WUS and reference signal positions 600 for the UE 115 regarding communications of WUSs 615 and reference signals 620. In some examples, the network entity 105-*a* may configure configurations 605-*a* and 605-*b*, which each may include relative WUS, reference signal, and data positions. The configuration 605-*a* may correspond to the configurations 405-*b* and 505-*b* and the configuration 605-*b* may correspond to the configurations 405-*c* and 505-*c* as described herein with reference to FIGS. 4 and 5.

As described herein with reference to FIG. 3, while operating in a DRX mode, the UE 115 may receive a first control message indicating a reference signal configuration, the reference signal configuration indicating a reference signal position associated with reference signals 620. The UE 115 may receive a second control message indicating a WUS configuration, the WUS configuration indicating a WUS position associated with one or more WUSs 615. In addition, the WUS position may be within a first time-domain offset of the reference signal position.

In some examples, the network entity 105 may configure the configuration 605-*a* or the configuration 605-*b* to include time-domain gaps before, after, or both before and after a reference signal position (e.g., around an SMTC window), where the gaps may include no data transmission or some irrelevant signal transmission to provide the UE 115 enough time to switch beams (e.g., select a best SSB beam for receiving data 625). For example, in the configuration 605-*a*, a reference signal position may be before a WUS position in time according to a time-domain offset. The UE 115 may wake up to monitor for and measure the reference signal 620-*a* during the reference signal occasion, where the reference signal 620-*a* may be followed by a gap 610-*a*. The gap 610-*a* may change receive beams if required. The UE 115 may monitor for and detect a WUS 615-*a* after the gap 610-*a* during the WUS position. In some examples, the WUS position may be followed by a relatively small gap (during which the UE 115 may take the time to fully ramp up to an awake mode from a sleep mode) and then a data position during which the UE 115 may receive data 625-*a*. The data position may coincide with the beginning of a DRX ON duration. In some examples, the UE 115 may ramp down to a sleep mode after receiving the data 625-*a*.

In the configuration 605-*b*, the reference signal position may be after the WUS position and a data position may be offset from the reference signal position. In addition, the network entity 105 may configure a gap 610-*b* before a reference signal 620-*b*, which may correspond to an SMTC window. As such, the UE 115 may wake up to monitor for a WUS 615-*b* during a WUS position. The UE 115 may detect the WUS 615-*b*, which may be followed by a gap 610-*b*. Following the gap 610-*b*, the UE 115 may receive a reference signal 620-*b* during the reference signal position, where the reference signal position may start at the beginning of a DRX Active duration. The DRX Active duration in the configuration 605-*b* may indicate how long the UE 115 may remain in an active (e.g., non-sleeping) mode during a DRX cycle. The DRX Active duration may be equal to or longer than the DRX ON duration in time. In some examples, the DRX ON duration in the configuration 605-*b* may indicate a minimum active duration for which the UE 115 may remain in an active mode after a wake-up. In such examples, the DRX Active duration being equal to or longer than the DRX ON duration in time may signify that the minimum active duration may be increased in this configuration to account for the reference signal 620-*b*.

After the reference signal 620-*b*, the network entity 105 may configure a gap 610-*c* which may be followed by a data position during which the UE 115 may receive data 625-*b*. As such, the data position may be offset from the beginning of the DRX Active duration by a delay, to make space for the reference signal 620-*b*, where the data transmission may be completed at the end of the DRX Active duration. As shown in the configuration 605-*b*, the DRX Active duration may be longer in time than the DRX ON duration of the configuration 605-*a*. In some examples, the UE 115 may ramp down to a sleep mode after receiving the data 625-*a*. As such, an inactivity timer (associated with the UE 115 operating in the sleep mode) may be begin after the DRX Active duration. The network entity 105 may indicate the gaps 610 to the UE 115 via the reference signal configuration or via other signaling sent to the UE 115.

Figure 7:
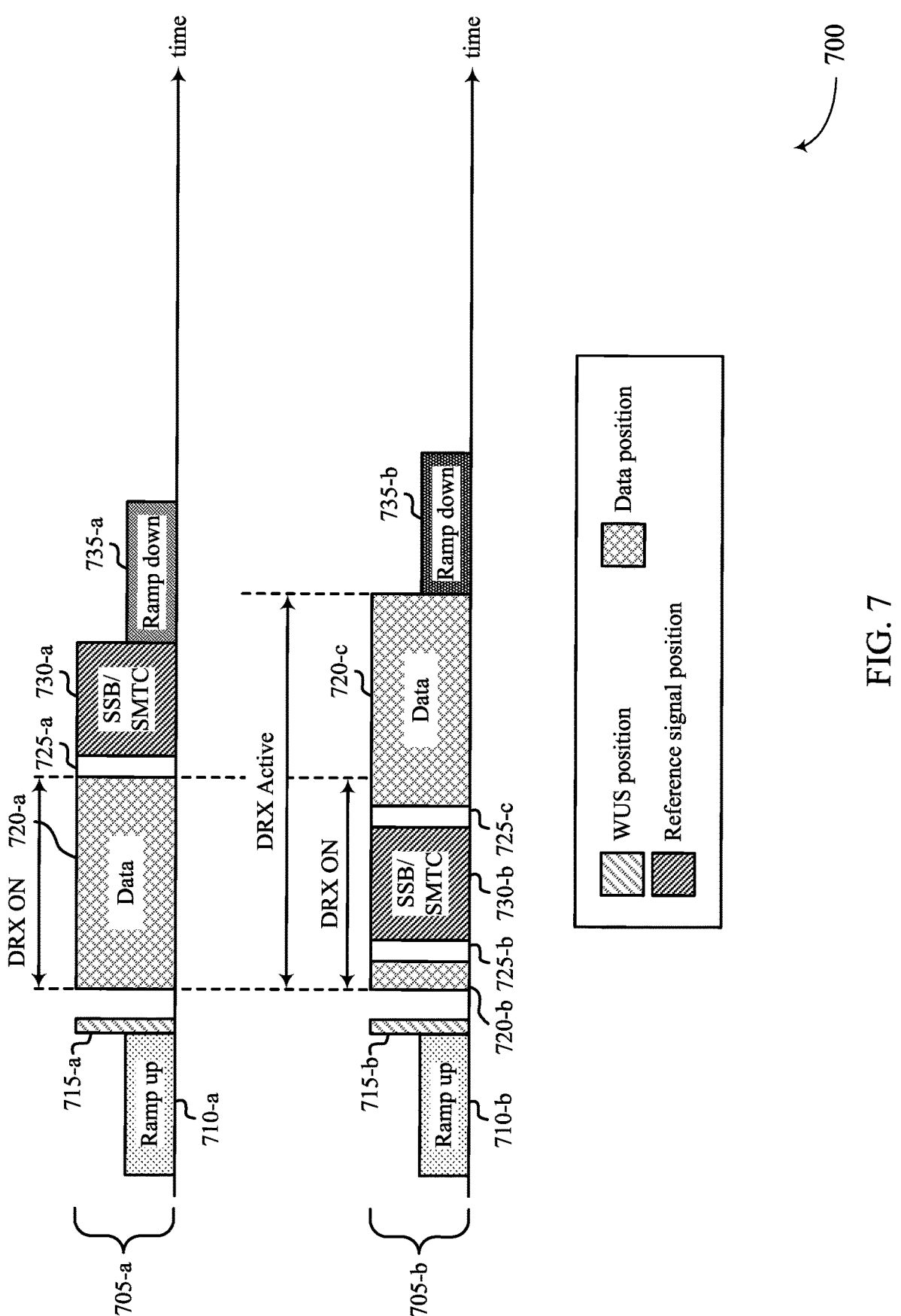

FIG. 7 shows an example of relative WUS and reference signal positions 700 that support techniques for relative positioning of WUSs and reference signals in accordance with one or more aspects of the present disclosure. In some examples, the relative WUS and reference signal positions 700 may implement aspects of the wireless communications system 100 and the network architecture 200 or may be implemented by aspects of the wireless communications system 100 and the network architecture 200. For example, a network entity 105 may configure the relative WUS and reference signal positions 700 for the UE 115 regarding communications of WUSs 715 and reference signals 730. In some examples, the network entity 105-*a* may configure configurations 705-*a* and 705-*b*, which each may include relative WUS, reference signal, and data positions.

As described herein with reference to FIG. 3, while operating in a DRX mode, the UE 115 may receive a first control message indicating a reference signal configuration, the reference signal configuration indicating a reference signal position associated with reference signals 730. The UE 115 may receive a second control message indicating a WUS configuration, the WUS configuration indicating a WUS position associated with one or more WUSs 715. In addition, the WUS position may be within a first time-domain offset of the reference signal position.

In the configuration 705-*a*, the network entity 105 may configure the reference signal position to occur at the end of a DRX ON duration such that the UE 115 may refrain from unnecessarily ramping up to monitor for a reference signal 730-*a*. The UE 115 may begin to transition from a sleep mode to an awake mode during a ramp up 710-*a*. The UE 115 may monitor for and detect a WUS 715-*a* during the WUS position. In some examples, the WUS position may be followed by a small gap during which the UE 115 may take the time to fully ramp up to an awake mode from a sleep mode prior to receiving data 720-*a*.

The UE 115 may receive the data 720-*a* during a data position that starts at the beginning of a DRX ON duration. In some examples, the network entity 105-*a* may configure a gap 725-*a* after the data position, where the reference signal position may follow the gap 725-*a*. The UE 115 may receive the reference signal 730-*a* (e.g., an SSB or an SMTC window) during the reference signal position and transition to the sleep mode during a ramp down 735-*a* after measuring the reference signal 730-*a*.

Alternatively, the network entity 105 may configure the reference signal position such that either at least a UE's ramp ups 710 and ramp downs 735 or the reference signal position itself (e.g., an SSB position or location) overlaps with (e.g., is located within) a DRX ON duration. In the configuration 705-b, the UE 115 may begin to transition from a sleep mode to an awake mode during a ramp up 710-b. The UE 115 may monitor for and detect a WUS 715-b during the WUS position. In some examples, the WUS position may be followed by a small gap during which the UE 115 may take time to fully ramp up to an awake mode from a sleep mode prior to receiving data 720-b.

At the beginning of a DRX ON duration and a coinciding DRX Active duration, the UE 115 may receive the data 720-b (e.g., PDCCH or PDSCH), followed by a gap 725-b, a reference signal 730-b (e.g., an SSB or an SMTC window), and a gap 725-c during the DRX ON duration and the DRX Active duration. Still during the DRX Active duration, the UE 115 may receive data 720-c. In this way, the network entity 105 may transmit the data 720-b, followed by a SSB or an SMTC window for measurement (e.g., for time-frequency offset correction), followed by the data 720-c (e.g., additional data). The data 720 may be communicated during data positions and the reference signal 730-b may be communicated during the reference signal position. The UE 115 may transition to the sleep mode during a ramp down 735-b after the end of the DRX Active duration. In some examples, the network entity 105 may configure the reference signal position to be within the DRX ON duration and the DRX Active duration as in the configuration 705-b in cross-slot scheduling scenarios. In some examples, the DRX Active duration may be equal to or longer than the DRX ON duration in the configuration 705-b. In such examples, the DRX ON duration in the configuration 705-b may indicate a minimum active duration for which the UE 115 may remain in an active mode after a wake-up signifying that the minimum active duration may be increased in this configuration to account for the reference signal 730-b. As such, by using the configurations 705-a and 705-b, the UE 115 may save at least one ramp up 710 or ramp down 735 based on the location of the respective reference signal position with respect to the DRX ON duration.

Figure 8:
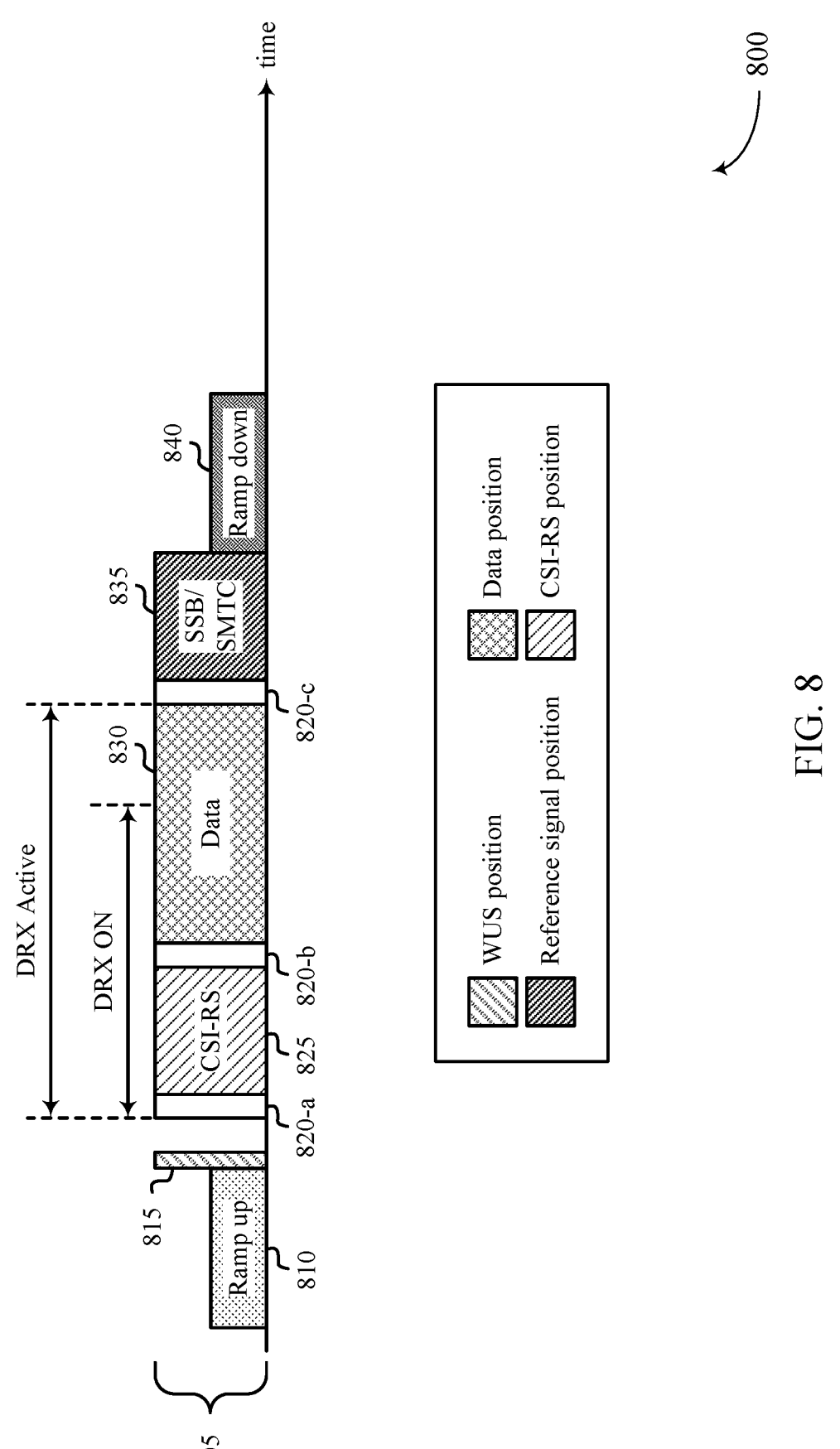

FIG. 8 shows an example of relative WUS and reference signal positions 800 that support techniques for relative positioning of WUSs and reference signals in accordance with one or more aspects of the present disclosure. In some examples, the relative WUS and reference signal positions 800 may implement aspects of the wireless communications system 100 and the network architecture 200 or may be implemented by aspects of the wireless communications system 100 and the network architecture 200. For example, a network entity 105 may configure the relative WUS and reference signal positions 800 for the UE 115 regarding communications of WUSs 815 and reference signals 835. In some examples, the network entity 105-a may configure a configuration 805, which may include relative WUS, reference signal, data, and channel state information (CSI) reference signal (CSI-RS) positions.

As described herein with reference to FIG. 3, while operating in a DRX mode, the UE 115 may receive a first control message indicating a reference signal configuration, the reference signal configuration indicating a reference signal position associated with reference signals 835. The UE 115 may receive a second control message indicating a WUS configuration, the WUS configuration indicating a WUS position associated with one or more WUSs 815. In addition, the WUS position may be within a first time-domain offset of the reference signal position.

In some examples, the techniques described herein may be used to determine the relative positions of various periodic and semi-persistent signals including WUSs 815 and reference signals 835 including SSBs, SMTC windows, CSI-RSs, positioning reference signals (PRSs), and tracking reference signals (TRSs), among other signals for which the UE 115 may wake up to measure. In some examples, the network entity 105 may jointly-determine the positions of these signals to minimize UE power while also satisfying a periodicity and latency associated with each signal.

The network entity 105 may configure the configuration 805 to include a CSI-RS position located relative to a WUS position, a reference signal position, and a data position. For example, the UE 115 may begin to transition from a sleep mode to an awake mode during a ramp up 810 and monitor for and detect a WUS 815 during the WUS position. In some examples, the WUS position may be followed by a small gap during which the UE 115 may take time to fully ramp up to an awake mode from a sleep mode prior to a DRX ON duration. At the beginning of the DRX ON duration and a DRX Active duration, the network entity 105 may configure a gap 820-a prior to transmitting a CSI-RS 825 during the CSI-RS position. The network entity 105 may configure a gap 820-b after the CSI-RS position, and the gap 820-a may be followed by a data position. The UE 115 may receive data 830 during the data position, which may be partially within the DRX ON duration and within the DRX Active duration. The data position may end at the end of the DRX Active duration. In some examples, the DRX Active duration may be equal to or longer than the DRX ON duration in the configuration 805. In such examples, the DRX ON duration in the configuration 805 may indicate a minimum active duration for which the UE 115 may remain in an active mode after a wake-up signifying that the minimum active duration may be increased in this configuration to account for the CSI-RS 825.

In some examples, the network entity 105 may configure a gap 820-c after the data position and the DRX Active duration before transmitting a reference signal 835 (e.g., an SSB, an SMTC window) during the reference signal position. In some cases, the UE 115 may transition to a sleep mode during a ramp down 840 after measuring the reference signal 835. By using the configuration 805, the UE 115 may save at least one ramp up 810 or ramp down 840 based on the location of the WUS position, the CSI-RS position, the data position, and the reference signal position with respect to each other and the DRX ON and DRX Active durations.

In some implementations, positions of cell-common signaling, such as SSBs, may be the same across all UEs 115 in a cell or even across cells. In addition, positions of group-common signaling, such as WUSs 815, may be determined per group of UEs 115, and positions of UE-specific signaling, such as CSI-RSs and TRSs may be determined per UE 115.

Figure 9:
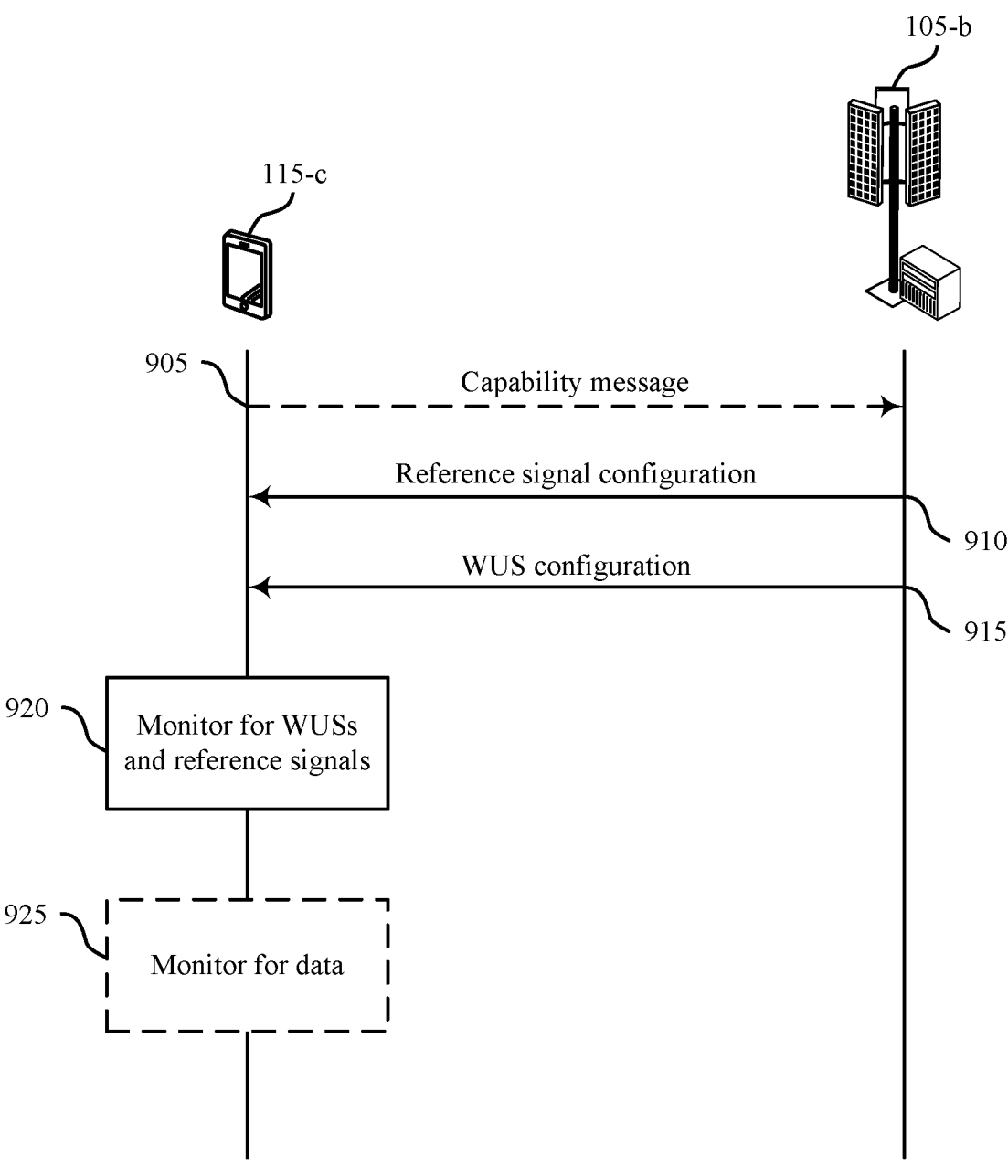
FIG. 9 shows an example of a process flow that supports techniques for relative positioning of WUSs and reference signals in accordance with one or more aspects of the present disclosure.

FIG. 9 shows an example of a process flow 900 that supports techniques for relative positioning of WUSs and reference signals in accordance with one or more aspects of the present disclosure. The process flow 900 may implement aspects of wireless communications system 100, the network architecture 200, and the relative WUS and reference signal positions 400, 500, 600, 700, and 800, or may be implemented by aspects of the wireless communications system 100, the network architecture 200, and the relative WUS and reference signal positions 400, 500, 600, 700, and 800. For example, the process flow 900 may illustrate operations between a UE 115-c and a network entity 105-b, which may be examples of corresponding devices described herein. For example, the UE 115-c and the network entity 105-b may be examples corresponding devices described herein. In the following description of the process flow 900, the operations between the UE 115-*c* and the network entity 105-*b* may be transmitted in a different order than the example order shown, or the operations performed by the UE 115-*c* and the network entity 105-*b* may be performed in different orders or at different times. Some operations may also be omitted from the process flow 900, and other operations may be added to the process flow 900.

At 905, the UE 115-*c* may transmit, to the network entity 105-*b*, a capability message indicating UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof. In some examples, the network entity 105-*b* may request the capability information from the UE 115-*c*. Alternatively, the network entity 105-*b* may determine the durations and power consumption parameters without receiving the capability information from the UE 115-*c*.

At 910, the UE 115-*c* may receive, from the network entity 105-*b* and while operating in a DRX mode, a first control message indicating a reference signal configuration, the reference signal configuration indicating a reference signal position associated with one or more reference signals (e.g., SSBs, SMTC windows). The reference signal position may be a location or period in time during which the UE 115-*c* may monitor for the one or more reference signals.

At 915, the UE 115-*c* may receive, from the network entity 105-*b*, a second control message indicating a WUS configuration, the WUS configuration indicating a WUS position that is associated with one or more WUSs and where the WUS position is within a configured first time-domain offset of the reference signal position in accordance with the reference signal configuration. In addition, the reference signal position is within a DRX cycle period that is within a configured second time-domain offset of the WUS position, where the configured first time-domain offset is based on one or more durations associated with the UE 115-*c* transitioning from an active state to a sleep state (e.g., a ramp up or a ramp down). For example, according to the first time-domain offset, the reference signal position may be before or after the WUS position. In addition, the reference signal position and the WUS position may be configured with respect to a data position (including a data transmission), a DRX ON or Active duration, or other factors.

At 920, the UE 115-*c* may monitor, in accordance with the configured first time-domain offset, for the one or more WUSs and the one or more reference signals. In some examples, if the UE 115-*c* fails to detect the one or more WUSs during a WUS position prior to a reference signal position, the UE 115-*c* may fail to detect and measure a reference signal.

At 925, the UE 115-*c* may monitor, in accordance with the configured first time-domain offset, for the one or more reference signals and data in accordance with the configured first time-domain offset, where the one or more reference signals and the data may be TDMed or FDMed. For example, the UE 115-*c* may monitor for the one or more reference signals and the data if the reference signal position is after the WUS position in time, and where the reference signal position at least partially overlaps or is followed by a data position associate with the data.

Figure 10:
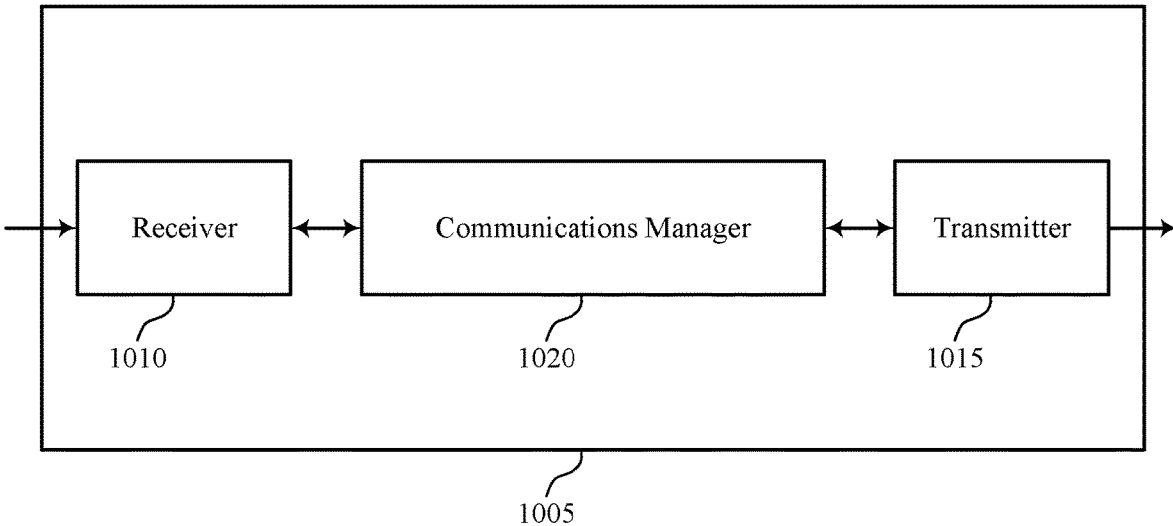
FIGS. 10 and 11 show block diagrams of devices that support techniques for relative positioning of WUSs and reference signals in accordance with one or more aspects of the present disclosure.

FIG. 10 shows a block diagram 1000 of a device 1005 that supports techniques for relative positioning of WUSs and reference signals in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for relative positioning of WUSs and reference signals). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for relative positioning of WUSs and reference signals). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for relative positioning of WUSs and reference signals as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for receiving, while operating in a DRX mode, a first control message indicating a reference signal configuration, the reference signal configuration indicating a reference signal position associated with one or more reference signals. The communications manager 1020 is capable of, configured to, or operable to support a means for receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state. The communications manager 1020 is capable of, configured to, or operable to support a means for monitoring, in accordance with the configured first time-domain offset, for the one or more WUSs and the one or more reference signals.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for relative positioning of WUSs and reference signals, which may reduce latency, reduce ramp times, reduce power consumption, and increase efficiency.

Figure 11:
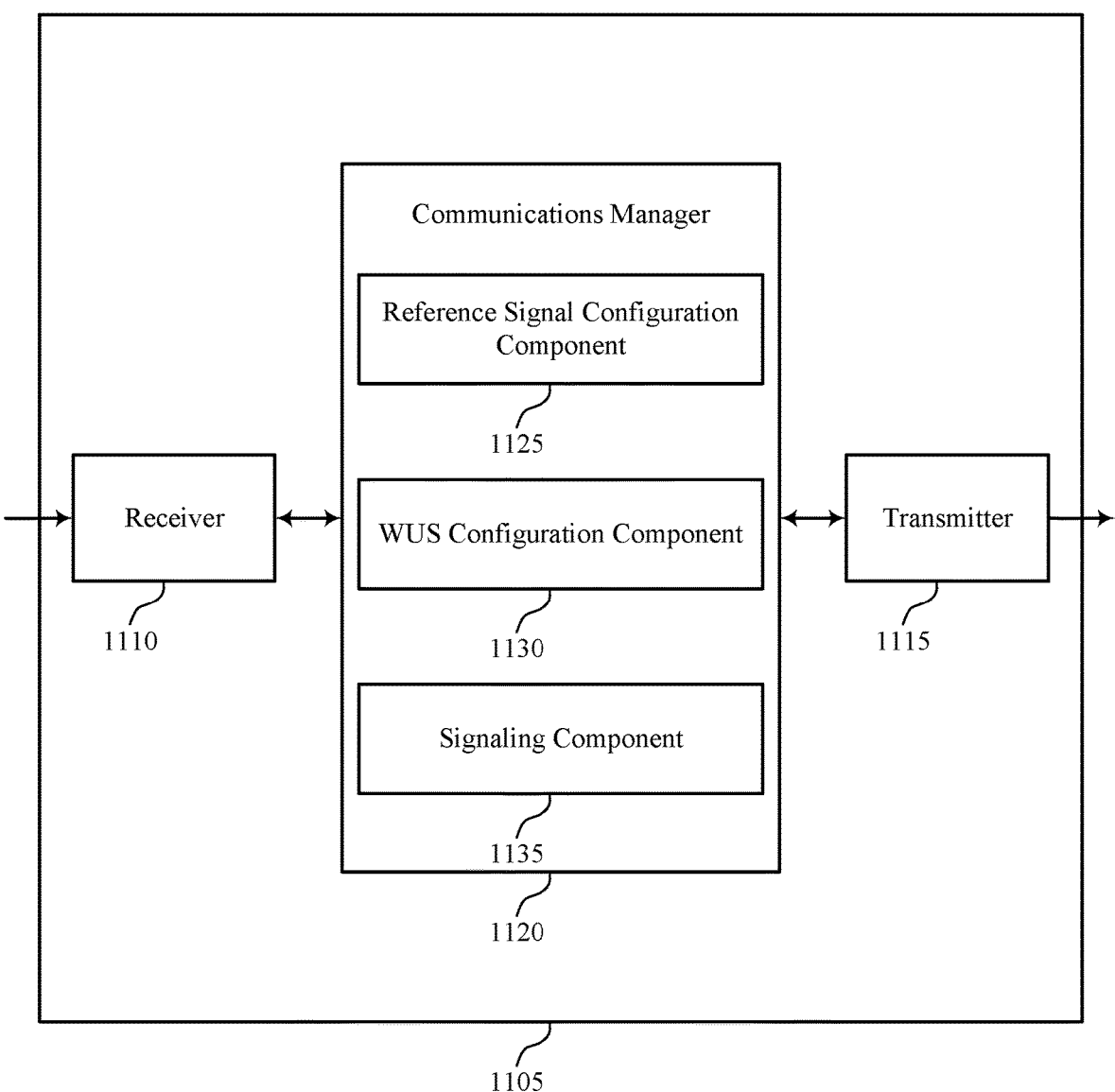

FIG. 11 shows a block diagram 1100 of a device 1105 that supports techniques for relative positioning of WUSs and reference signals in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for relative positioning of WUSs and reference signals). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for relative positioning of WUSs and reference signals). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for relative positioning of WUSs and reference signals as described herein. For example, the communications manager 1120 may include a reference signal configuration component 1125, a WUS configuration component 1130, a signaling component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The reference signal configuration component 1125 is capable of, configured to, or operable to support a means for receiving, while operating in a DRX mode, a first control message indicating a reference signal configuration, the reference signal configuration indicating a reference signal position associated with one or more reference signals. The WUS configuration component 1130 is capable of, configured to, or operable to support a means for receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and. The signaling component 1135 is capable of, configured to, or operable to support a means for monitoring, in accordance with the configured first time-domain offset, for the one or more WUSs and the one or more reference signals.

Figure 12:
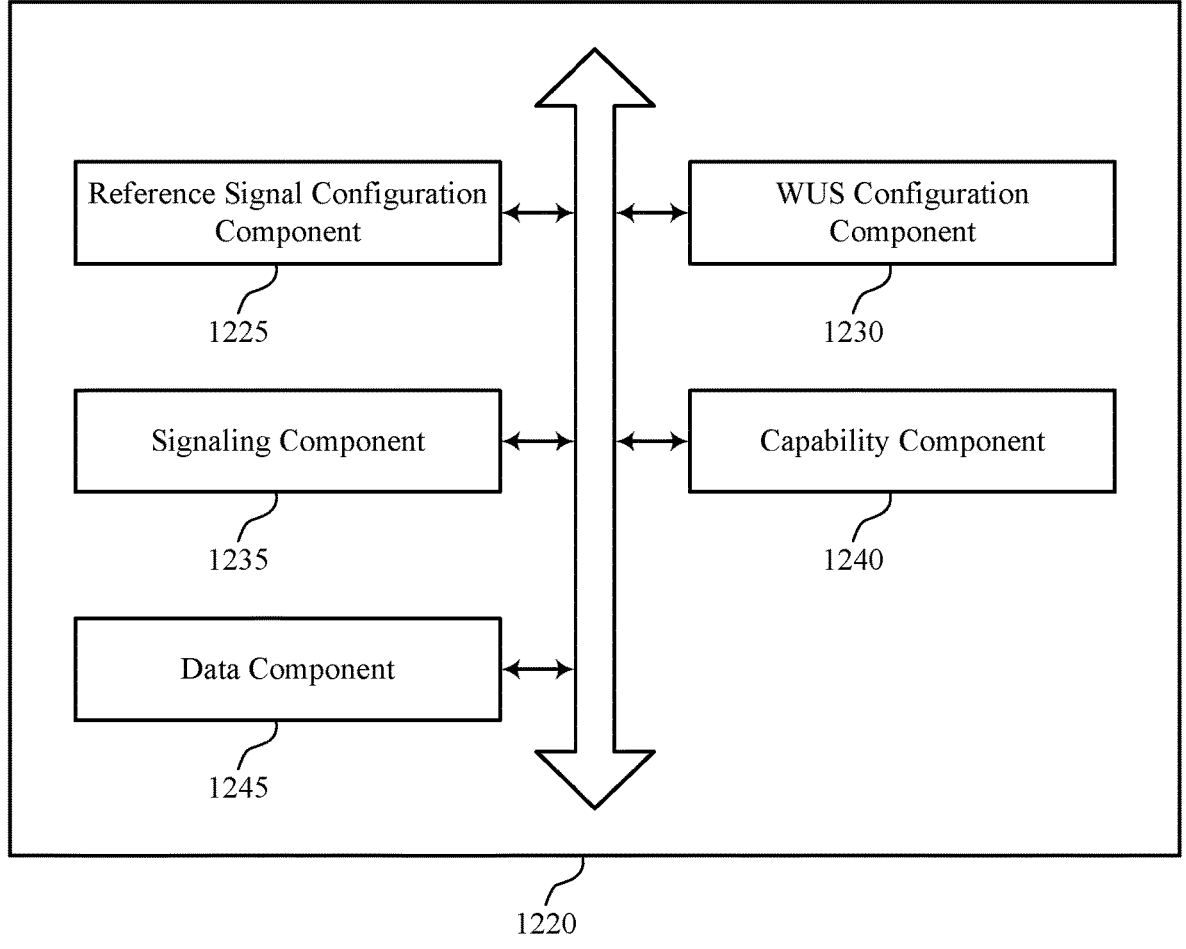
FIG. 12 shows a block diagram of a communications manager that supports techniques for relative positioning of WUSs and reference signals in accordance with one or more aspects of the present disclosure.

FIG. 12 shows a block diagram 1200 of a communications manager 1220 that supports techniques for relative positioning of WUSs and reference signals in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for relative positioning of WUSs and reference signals as described herein. For example, the communications manager 1220 may include a reference signal configuration component 1225, a WUS configuration component 1230, a signaling component 1235, a capability component 1240, a data component 1245, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The reference signal configuration component 1225 is capable of, configured to, or operable to support a means for receiving, while operating in a DRX mode, a first control message indicating a reference signal configuration, the reference signal configuration indicating a reference signal position associated with one or more reference signals. The WUS configuration component 1230 is capable of, configured to, or operable to support a means for receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and. The signaling component 1235 is capable of, configured to, or operable to support a means for monitoring, in accordance with the configured first time-domain offset, for the one or more WUSs and the one or more reference signals.

In some examples, the reference signal position is before the WUS position in time in accordance with the configured first time-domain offset. In some examples, the reference signal position is after the WUS position in time in accordance with the configured first time-domain offset.

In some examples, the reference signal position is associated with a SSB-based measurement timing configuration (SMTC) and is after the wakeup signal position in time in accordance with the configured first time-domain offset. In some examples, the reference signal position is followed by a data position associated with data.

In some examples, the signaling component 1235 is capable of, configured to, or operable to support a means for refraining from monitoring for the one or more reference signals based on failing to receive a WUS in accordance with the WUS position.

In some examples, the reference signal position is after the WUS position in time in accordance with the configured first time-domain offset. In some examples, the reference signal position at least partially overlaps with a data position associated with data.

In some examples, the data component 1245 is capable of, configured to, or operable to support a means for monitoring for the one or more reference signals and the data in accordance with the configured first time-domain offset, where the one or more reference signals and the data are TDMed.

In some examples, the data component 1245 is capable of, configured to, or operable to support a means for monitoring for the one or more reference signals and the data in accordance with the configured first time-domain offset, where the one or more reference signals and the data are FDMed.

In some examples, the capability component 1240 is capable of, configured to, or operable to support a means for transmitting a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof, where the reference signal configuration is based on the UE capability information.

In some examples, the reference signal configuration indicates respective time-domain gaps at least before or after the reference signal position during which data is excluded from transmission. In some examples, the configured first time-domain offset applies between the reference signal position and a configured ON duration for the DRX mode.

In some examples, the first control message indicates one or more additional reference signal configurations indicating respective reference signal positions associated with one or more additional reference signals that are periodic or semi-persistent. In some examples, the configured first time-domain offset applies between reference signal positions of at least one pair of additional reference signals, the one or more reference signals, and the one or more WUSs.

In some examples, the reference signal configuration corresponds to one or more UEs within one or more cells. In some examples, the WUS configuration corresponds to one or more UEs or a group of UEs, and an additional reference signal configuration corresponds to the UE. In some examples, the monitoring is performed while the UE is in an awake mode or one or more sleep modes.

Figure 13:
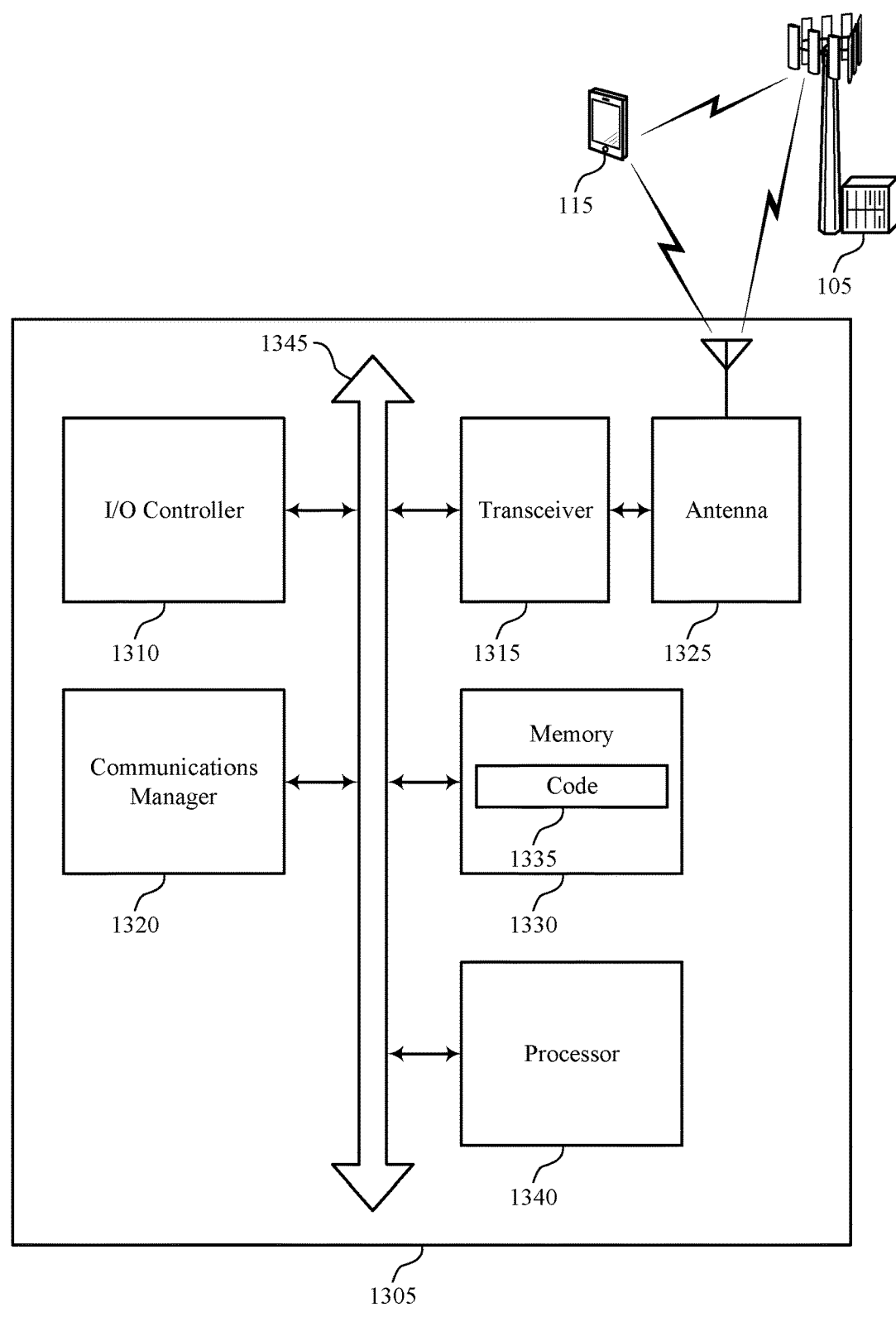
FIG. 13 shows a diagram of a system including a device that supports techniques for relative positioning of WUSs and reference signals in accordance with one or more aspects of the present disclosure.

FIG. 13 shows a diagram of a system 1300 including a device 1305 that supports techniques for relative positioning of WUSs and reference signals in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting techniques for relative positioning of WUSs and reference signals). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for receiving, while operating in a DRX mode, a first control message indicating a reference signal configuration, the reference signal configuration indicating a reference signal position associated with one or more reference signals. The communications manager 1320 is capable of, configured to, or operable to support a means for receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state; and. The communications manager 1320 is capable of, configured to, or operable to support a means for monitoring, in accordance with the configured first time-domain offset, for the one or more WUSs and the one or more reference signals.

By including or configuring the communications manager 1320 in accordance with examples as described herein, the device 1305 may support techniques for relative positioning of WUSs and reference signals, which may reduce latency, reduce ramp times, reduce power consumption, and increase efficiency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of techniques for relative positioning of WUSs and reference signals as described herein, or the at least one processor 1340 and the at least one memory 1330 may be otherwise configured to, individually or collectively, perform or support such operations.

Figure 14:
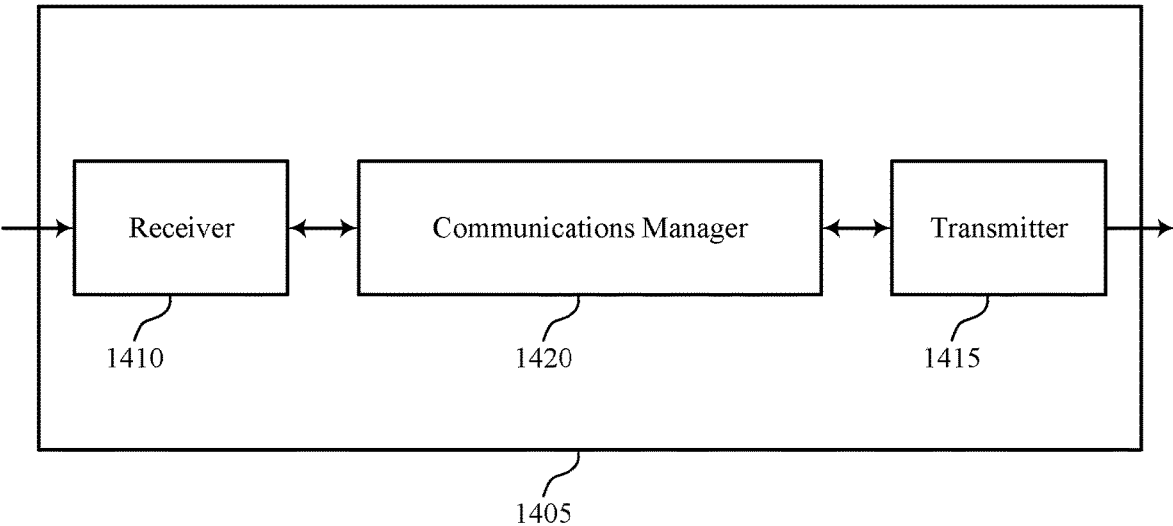
FIGS. 14 and 15 show block diagrams of devices that support techniques for relative positioning of WUSs and reference signals in accordance with one or more aspects of the present disclosure.

FIG. 14 shows a block diagram 1400 of a device 1405 that supports techniques for relative positioning of WUSs and reference signals in accordance with one or more aspects of the present disclosure. The device 1405 may be an example of aspects of a network entity 105 as described herein. The device 1405 may include a receiver 1410, a transmitter 1415, and a communications manager 1420. The device 1405, or one or more components of the device 1405 (e.g., the receiver 1410, the transmitter 1415, and the communications manager 1420), may include at least one processor, which may be coupled with at least one memory, to, individually or collectively, support or enable the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of techniques for relative positioning of WUSs and reference signals as described herein. For example, the communications manager 1420, the receiver 1410, the transmitter 1415, or various combinations or components thereof may be capable of performing one or more of the functions described herein.

In some examples, the communications manager 1420, the receiver 1410, the transmitter 1415, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1420, the receiver 1410, the transmitter 1415, or various combinations or components thereof may be implemented in code (e.g., as communications management software or firmware) executed by at least one processor. If implemented in code executed by at least one processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. For example, the communications manager 1420 is capable of, configured to, or operable to support a means for outputting a first control message indicating a reference signal configuration, the reference signal configuration indicating a reference signal position associated with one or more reference signals. The communications manager 1420 is capable of, configured to, or operable to support a means for outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state. The communications manager 1420 is capable of, configured to, or operable to support a means for outputting, in accordance with the configured first time-domain offset, the one or more WUSs and the one or more reference signals.

By including or configuring the communications manager 1420 in accordance with examples as described herein, the device 1405 (e.g., at least one processor controlling or otherwise coupled with the receiver 1410, the transmitter 1415, the communications manager 1420, or a combination thereof) may support techniques for relative positioning of WUSs and reference signals, which may reduce latency, reduce ramp times, reduce power consumption, and increase efficiency.

Figure 15:
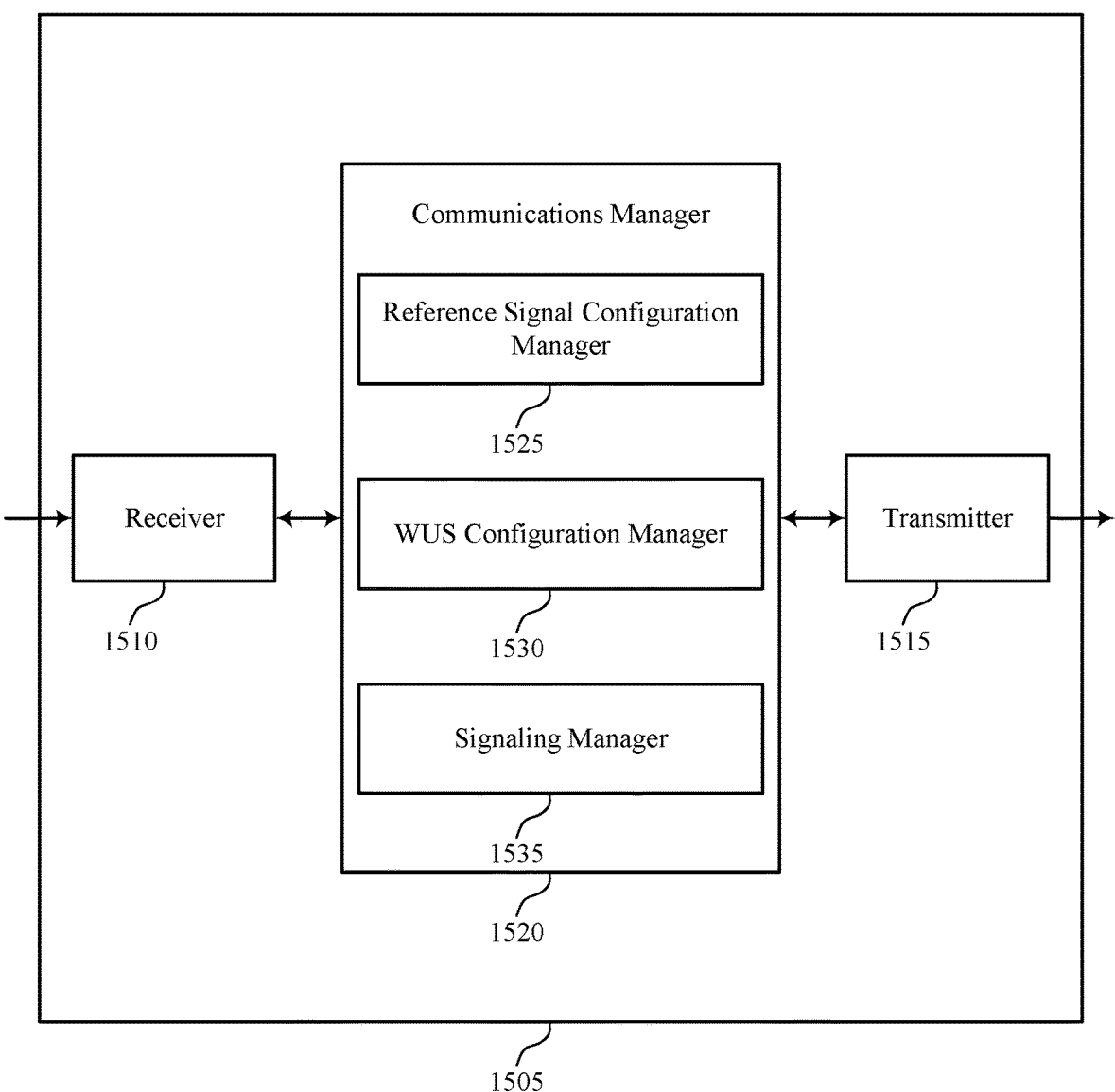

FIG. 15 shows a block diagram 1500 of a device 1505 that supports techniques for relative positioning of WUSs and reference signals in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505, or one or more components of the device 1505 (e.g., the receiver 1510, the transmitter 1515, and the communications manager 1520), may include at least one processor, which may be coupled with at least one memory, to support the described techniques. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of techniques for relative positioning of WUSs and reference signals as described herein. For example, the communications manager 1520 may include a reference signal configuration manager 1525, a WUS configuration manager 1530, a signaling manager 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications in accordance with examples as disclosed herein. The reference signal configuration manager 1525 is capable of, configured to, or operable to support a means for outputting a first control message indicating a reference signal configuration, the reference signal configuration indicating a reference signal position associated with one or more reference signals. The WUS configuration manager 1530 is capable of, configured to, or operable to support a means for outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state. The signaling manager 1535 is capable of, configured to, or operable to support a means for outputting, in accordance with the configured first time-domain offset, the one or more WUSs and the one or more reference signals.

Figure 16:
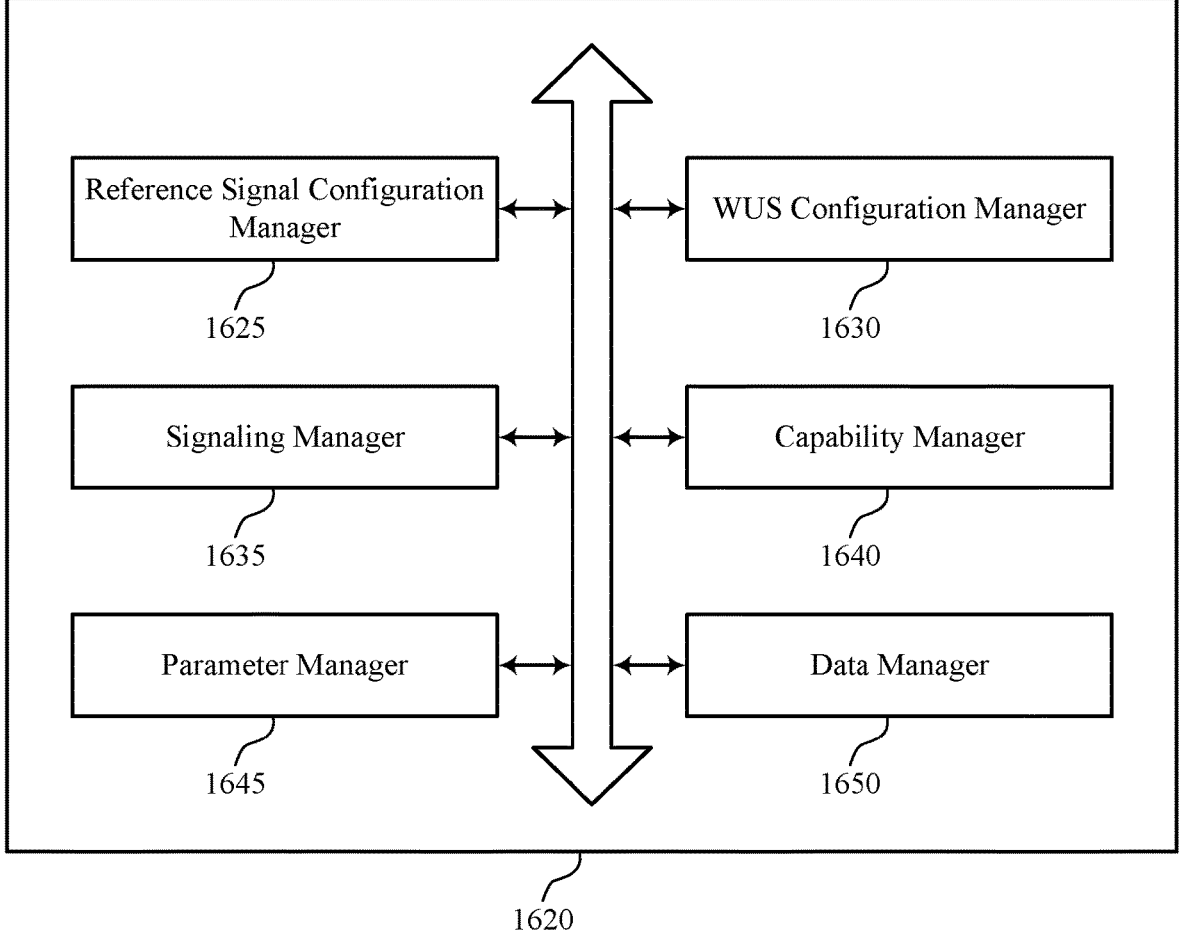
FIG. 16 shows a block diagram of a communications manager that supports techniques for relative positioning of WUSs and reference signals in accordance with one or more aspects of the present disclosure.

FIG. 16 shows a block diagram 1600 of a communications manager 1620 that supports techniques for relative positioning of WUSs and reference signals in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of techniques for relative positioning of WUSs and reference signals as described herein. For example, the communications manager 1620 may include a reference signal configuration manager 1625, a WUS configuration manager 1630, a signaling manager 1635, a capability manager 1640, a parameter manager 1645, a data manager 1650, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications in accordance with examples as disclosed herein. The reference signal configuration manager 1625 is capable of, configured to, or operable to support a means for outputting a first control message indicating a reference signal configuration, the reference signal configuration indicating a reference signal position associated with one or more reference signals. The WUS configuration manager 1630 is capable of, configured to, or operable to support a means for outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state. The signaling manager 1635 is capable of, configured to, or operable to support a means for outputting, in accordance with the configured first time-domain offset, the one or more WUSs and the one or more reference signals.

In some examples, the reference signal position is before the WUS position in time in accordance with the configured first time-domain offset. In some examples, the reference signal position is after the WUS position in time in accordance with the configured first time-domain offset.

In some examples, the reference signal position is associated with a SMTC and is after the WUS position in time in accordance with the configured first time-domain offset. In some examples, the reference signal position is followed by a data position associated with data.

In some examples, the reference signal position is after the WUS position in time in accordance with the configured first time-domain offset. In some examples, the reference signal position at least partially overlaps with a data position associated with data.

In some examples, the data manager 1650 is capable of, configured to, or operable to support a means for outputting the one or more reference signals and the data in accordance with the configured first time-domain offset, where the one or more reference signals and the data are TDMed.

In some examples, the data manager 1650 is capable of, configured to, or operable to support a means for outputting the one or more reference signals and the data in accordance with the configured first time-domain offset, where the one or more reference signals and the data are FDMed.

In some examples, the capability manager 1640 is capable of, configured to, or operable to support a means for obtaining a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with a UE, the awake mode the one or more sleep modes, the transitions, or a combination thereof, where the reference signal configuration is based on the UE capability information.

In some examples, the parameter manager 1645 is capable of, configured to, or operable to support a means for determining a duration associated with transitioning to an awake mode from one or more sleep modes, a duration associated with transitioning to the one or more sleep modes from the awake mode, or both, and further determining one or more power consumption parameters associated with a UE, the awake mode, the one or more sleep modes, the transitions, or a combination thereof, where the reference signal configuration is based on the durations and the one or more power consumption parameters.

In some examples, the reference signal configuration indicates respective time-domain gaps at least before or after the reference signal position during which data is excluded from transmission. In some examples, the configured first time-domain offset applies between the reference signal position and a configured ON duration for the DRX mode.

In some examples, the first control message indicates one or more additional reference signal configurations indicating respective reference signal positions associated with one or more additional reference signals that are periodic or semi-persistent. In some examples, the configured first time-domain offset applies between reference signal positions of at least one pair of additional reference signals, the one or more reference signals, and the one or more WUSs.

In some examples, the reference signal configuration corresponds to one or more UEs within one or more cells. In some examples, the WUS configuration corresponds to one or more UEs or a group of UEs, and an additional reference signal configuration corresponds to a UE. In some examples, the one or more WUSs and the one or more reference signals are output while the UE is in an awake mode or one or more sleep modes.

Figure 17:
FIG. 17 shows a diagram of a system including a device that supports techniques for relative positioning of WUSs and reference signals in accordance with one or more aspects of the present disclosure.

FIG. 17 shows a diagram of a system 1700 including a device 1705 that supports techniques for relative positioning of WUSs and reference signals in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, at least one memory 1725, code 1730, and at least one processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or one or more memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or one or more memory components (e.g., the at least one processor 1735, the at least one memory 1725, or both), may be included in a chip or chip assembly that is installed in the device 1705. In some examples, the transceiver 1710 may be operable to support communications via one or more communications links (e.g., a communication link 125, a backhaul communication link 120, a midhaul communication link 162, a fronthaul communication link 168).

The at least one memory 1725 may include RAM, ROM, or any combination thereof. The at least one memory 1725 may store computer-readable, computer-executable code 1730 including instructions that, when executed by one or more of the at least one processor 1735, cause the device 1705 to perform various functions described herein. The code 1730 may be stored in a non-transitory computer-readable medium such as system memory or another type of memory. In some cases, the code 1730 may not be directly executable by a processor of the at least one processor 1735 but may cause a computer (e.g., when compiled and executed) to perform functions described herein. In some cases, the at least one memory 1725 may contain, among other things, a BIOS which may control basic hardware or software operation such as the interaction with peripheral components or devices. In some examples, the at least one processor 1735 may include multiple processors and the at least one memory 1725 may include multiple memories. One or more of the multiple processors may be coupled with one or more of the multiple memories which may, individually or collectively, be configured to perform various functions herein (for example, as part of a processing system).

The at least one processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1735 may be configured to operate a memory array using a memory controller. In some other cases, a memory controller may be integrated into one or more of the at least one processor 1735. The at least one processor 1735 may be configured to execute computer-readable instructions stored in a memory (e.g., one or more of the at least one memory 1725) to cause the device 1705 to perform various functions (e.g., functions or tasks supporting techniques for relative positioning of WUSs and reference signals). For example, the device 1705 or a component of the device 1705 may include at least one processor 1735 and at least one memory 1725 coupled with one or more of the at least one processor 1735, the at least one processor 1735 and the at least one memory 1725 configured to perform various functions described herein. The at least one processor 1735 may be an example of a cloud-computing platform (e.g., one or more physical nodes and supporting software such as operating systems, virtual machines, or container instances) that may host the functions (e.g., by executing code 1730) to perform the functions of the device 1705. The at least one processor 1735 may be any one or more suitable processors capable of executing scripts or instructions of one or more software programs stored in the device 1705 (such as within one or more of the at least one memory 1725). In some examples, the at least one processor 1735 may include multiple processors and the at least one memory 1725 may include multiple memories. One or more of the multiple processors may be coupled with one or more of the multiple memories, which may, individually or collectively, be configured to perform various functions herein. In some examples, the at least one processor 1735 may be a component of a processing system, which may refer to a system (such as a series) of machines, circuitry (including, for example, one or both of processor circuitry (which may include the at least one processor 1735) and memory circuitry (which may include the at least one memory 1725)), or components, that receives or obtains inputs and processes the inputs to produce, generate, or obtain a set of outputs. The processing system may be configured to perform one or more of the functions described herein. For example, the at least one processor 1735 or a processing system including the at least one processor 1735 may be configured to, configurable to, or operable to cause the device 1705 to perform one or more of the functions described herein. Further, as described herein, being "configured to," being "configurable to," and being "operable to" may be used interchangeably and may be associated with a capability, when executing code stored in the at least one memory 1725 or otherwise, to perform one or more of the functions described herein.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the at least one memory 1725, the code 1730, and the at least one processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications in accordance with examples as disclosed herein. For example, the communications manager 1720 is capable of, configured to, or operable to support a means for outputting a first control message indicating a reference signal configuration, the reference signal configuration indicating a reference signal position associated with one or more reference signals. The communications manager 1720 is capable of, configured to, or operable to support a means for outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state. The communications manager 1720 is capable of, configured to, or operable to support a means for outputting, in accordance with the configured first time-domain offset, the one or more WUSs and the one or more reference signals.

By including or configuring the communications manager 1720 in accordance with examples as described herein, the device 1705 may support techniques for relative positioning of WUSs and reference signals, which may reduce latency, reduce ramp times, reduce power consumption, and increase efficiency.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, one or more of the at least one processor 1735, one or more of the at least one memory 1725, the code 1730, or any combination thereof (for example, by a processing system including at least a portion of the at least one processor 1735, the at least one memory 1725, the code 1730, or any combination thereof). For example, the code 1730 may include instructions executable by one or more of the at least one processor 1735 to cause the device 1705 to perform various aspects of techniques for relative positioning of WUSs and reference signals as described herein, or the at least one processor 1735 and the at least one memory 1725 may be otherwise configured to, individually or collectively, perform or support such operations.

FIG. 18 shows a flowchart illustrating a method 1800 that supports techniques for relative positioning of WUSs and reference signals in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving, while operating in a DRX mode, a first control message indicating a reference signal configuration, the reference signal configuration indicating a reference signal position associated with one or more reference signals. The operations of 1805 may be performed in accordance with examples as disclosed herein. In some examples, aspects of the operations of 1805 may be performed by a reference signal configuration component 1225 as described with reference to FIG. 12.

At 1810, the method may include receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state. The operations of 1810 may be performed in accordance with examples as disclosed herein. In some examples, aspects of the operations of 1810 may be performed by a WUS configuration component 1230 as described with reference to FIG. 12.

At 1815, the method may include monitoring, in accordance with the configured first time-domain offset, for the one or more WUSs and the one or more reference signals. The operations of 1815 may be performed in accordance with examples as disclosed herein. In some examples, aspects of the operations of 1815 may be performed by a signaling component 1235 as described with reference to FIG. 12.

FIG. 19 shows a flowchart illustrating a method 1900 that supports techniques for relative positioning of WUSs and reference signals in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving, while operating in a DRX mode, a first control message indicating a reference signal configuration, the reference signal configuration indicating a reference signal position associated with one or more reference signals. The operations of 1905 may be performed in accordance with examples as disclosed herein. In some examples, aspects of the operations of 1905 may be performed by a reference signal configuration component 1225 as described with reference to FIG. 12.

At 1910, the method may include receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state. The reference signal position is associated with an SMTC and is after the WUS position in time in accordance with the configured first time-domain offset, where the reference signal position is followed by a data position associated with data. The operations of 1910 may be performed in accordance with examples as disclosed herein. In some examples, aspects of the operations of 1910 may be performed by a WUS configuration component 1230 as described with reference to FIG. 12.

At 1915, the method may include refraining from monitoring for the one or more reference signals based on failing to receive a WUS in accordance with the WUS position. The operations of 1915 may be performed in accordance with examples as disclosed herein. In some examples, aspects of the operations of 1915 may be performed by a signaling component 1235 as described with reference to FIG. 12.

FIG. 20 shows a flowchart illustrating a method 2000 that supports techniques for relative positioning of WUSs and reference signals in accordance with one or more aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the method may include transmitting a capability message including UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof. The operations of 2005 may be performed in accordance with examples as disclosed herein. In some examples, aspects of the operations of 2005 may be performed by a capability component 1240 as described with reference to FIG. 12.

At 2010, the method may include receiving, while operating in a DRX mode, a first control message indicating a reference signal configuration, the reference signal configuration indicating a reference signal position associated with one or more reference signals, where the reference signal configuration is based on the capability information. The operations of 2010 may be performed in accordance with examples as disclosed herein. In some examples, aspects of the operations of 2010 may be performed by a reference signal configuration component 1225 as described with reference to FIG. 12.

At 2015, the method may include receiving a second control message indicating a WUS configuration, the WUS configuration indicating a WUS position that is associated with one or more WUSs and within a configured first time-domain offset of the reference signal position in accordance with the reference signal configuration, where the reference signal position is within a DRX cycle period that is within a configured second time-domain offset of the WUS position, and where the configured first time-domain offset is based one or more durations associated with the UE transitioning from an active state to a sleep state. The operations of 2015 may be performed in accordance with examples as disclosed herein. In some examples, aspects of the operations of 2015 may be performed by a WUS configuration component 1230 as described with reference to FIG. 12.

At 2020, the method may include monitoring, in accordance with the configured first time-domain offset, for the one or more WUSs and the one or more reference signals. The operations of 2020 may be performed in accordance with examples as disclosed herein. In some examples, aspects of the operations of 2020 may be performed by a signaling component 1235 as described with reference to FIG. 12.

FIG. 21 shows a flowchart illustrating a method 2100 that supports techniques for relative positioning of WUSs and reference signals in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include outputting a first control message indicating a reference signal configuration, the reference signal configuration indicating a reference signal position associated with one or more reference signals. The operations of 2105 may be performed in accordance with examples as disclosed herein. In some examples, aspects of the operations of 2105 may be performed by a reference signal configuration manager 1625 as described with reference to FIG. 16.

At 2110, the method may include outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state. The operations of 2110 may be performed in accordance with examples as disclosed herein. In some examples, aspects of the operations of 2110 may be performed by a WUS configuration manager 1630 as described with reference to FIG. 16.

At 2115, the method may include outputting, in accordance with the configured first time-domain offset, the one or more WUSs and the one or more reference signals. The operations of 2115 may be performed in accordance with examples as disclosed herein. In some examples, aspects of the operations of 2115 may be performed by a signaling manager 1635 as described with reference to FIG. 16.

FIG. 22 shows a flowchart illustrating a method 2200 that supports techniques for relative positioning of WUSs and reference signals in accordance with one or more aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include outputting a first control message indicating a reference signal configuration, the reference signal configuration indicating a reference signal position associated with one or more reference signals. The operations of 2205 may be performed in accordance with examples as disclosed herein. In some examples, aspects of the operations of 2205 may be performed by a reference signal configuration manager 1625 as described with reference to FIG. 16.

At 2210, the method may include outputting a second control message indicating a WUS configuration, the WUS configuration indicating a WUS position that is associated with one or more WUSs and within a configured first time-domain offset of the WUS position in accordance with the reference signal configuration, where the reference signal position is within a DRX cycle period that is within a configured second time-domain offset of the WUS position, and where the configured first time-domain offset is based one or more durations associated with a UE transitioning from an active state to a sleep state. The operations of 2210 may be performed in accordance with examples as disclosed herein. In some examples, aspects of the operations of 2210 may be performed by a WUS configuration manager 1630 as described with reference to FIG. 16.

At 2215, the method may include outputting the one or more reference signals and the data in accordance with the configured first time-domain offset, where the one or more reference signals and the data are FDMed. The operations of 2215 may be performed in accordance with examples as disclosed herein. In some examples, aspects of the operations of 2215 may be performed by a data manager 1650 as described with reference to FIG. 16.

The following provides an overview of aspects of the present disclosure:

Aspect 1: A method for wireless communications at a UE, comprising: receiving, while operating in a DRX mode, a first control message indicating a reference signal configuration, the reference signal configuration indicating a reference signal position associated with one or more reference signals; receiving a second control message indicating a WUS configuration, the WUS configuration indicating a WUS position that is associated with one or more WUSs and within a configured first time-domain offset of the reference signal position in accordance with the reference signal configuration, wherein the reference signal position is within a DRX cycle period that is within a configured second time-domain offset of the WUS position, and wherein the configured first time-domain offset is based at least in part one or more durations associated with the UE transitioning from an active state to a sleep state; and monitoring, in accordance with the configured first time-domain offset, for the one or more WUSs and the one or more reference signals.

Aspect 2: The method of aspect 1, wherein the reference signal position is before the WUS position in time in accordance with the configured first time-domain offset.

Aspect 3: The method of any of aspects 1 through 2, wherein the reference signal position is after the WUS position in time in accordance with the configured first time-domain offset.

Aspect 4: The method of any of aspects 1 through 3, wherein the reference signal position is associated with an SMTC and is after the WUS position in time in accordance with the configured first time-domain offset, and the reference signal position is followed by a data position associated with data.

Aspect 5: The method of aspect 4, further comprising: refraining from monitoring for the one or more reference signals based at least in part on failing to receive a WUS in accordance with the WUS position.

Aspect 6: The method of any of aspects 1 through 5, wherein the reference signal position is after the WUS position in time in accordance with the configured first time-domain offset, and the reference signal position at least partially overlaps with a data position associated with data.

Aspect 7: The method of aspect 6, further comprising: monitoring for the one or more reference signals and the data in accordance with the configured first time-domain offset, wherein the one or more reference signals and the data are time-division multiplexed.

Aspect 8: The method of any of aspects 6 through 7, further comprising: monitoring for the one or more reference signals and the data in accordance with the configured first time-domain offset, wherein the one or more reference signals and the data are frequency-division multiplexed.

Aspect 9: The method of any of aspects 1 through 8, further comprising: transmitting a capability message comprising UE capability information, the UE capability information indicating a duration associated with transitioning to an awake mode from one or more sleep modes, a duration associated with transitioning to the one or more sleep modes from the awake mode, or both, and further indicating one or more power consumption parameters associated with the UE, the awake mode, the one or more sleep modes, the transitions, or a combination thereof, wherein the reference signal configuration is based at least in part on the UE capability information.

Aspect 10: The method of any of aspects 1 through 9, wherein the reference signal configuration indicates respective time-domain gaps at least before or after the reference signal position during which data is excluded from transmission.

Aspect 11: The method of any of aspects 1 through 10, wherein the configured first time-domain offset applies between the reference signal position and a configured ON duration for the DRX mode.

Aspect 12: The method of any of aspects 1 through 11, wherein the first control message indicates one or more additional reference signal configurations indicating respective reference signal positions associated with one or more additional reference signals that are periodic or semi-persistent, the configured first time-domain offset applies between reference signal positions of at least one pair of additional reference signals, the one or more reference signals, and the one or more WUSs.

Aspect 13: The method of any of aspects 1 through 12, wherein the reference signal configuration corresponds to one or more UEs within one or more cells, and the WUS configuration corresponds to one or more UEs or a group of UEs, and an additional reference signal configuration corresponds to the UE.

Aspect 14: The method of any of aspects 1 through 13, wherein the monitoring is performed while the UE is in an awake mode or one or more sleep modes.

Aspect 15: A method for wireless communications at a network entity, comprising: outputting a first control message indicating a reference signal configuration, the reference signal configuration indicating a reference signal position associated with one or more reference signals; outputting a second control message indicating a WUS configuration, the WUS configuration indicating a WUS position that is associated with one or more WUSs and within a configured first time-domain offset of the WUS position in accordance with the reference signal configuration, wherein the reference signal position is within a DRX cycle period that is within a configured second time-domain offset of the WUS position, and wherein the configured first time-domain offset is based at least in part one or more durations associated with a UE transitioning from an active state to a sleep state; and outputting, in accordance with the configured first time-domain offset, the one or more WUSs and the one or more reference signals.

Aspect 16: The method of aspect 15, wherein the reference signal position is before the WUS position in time in accordance with the configured first time-domain offset.

Aspect 17: The method of any of aspects 15 through 16, wherein the reference signal position is after the WUS position in time in accordance with the configured first time-domain offset.

Aspect 18: The method of any of aspects 15 through 17, wherein the reference signal position is associated with an SMTC and is after the WUS position in time in accordance with the configured first time-domain offset, and the reference signal position is followed by a data position associated with data.

Aspect 19: The method of any of aspects 15 through 18, wherein the reference signal position is after the WUS position in time in accordance with the configured first time-domain offset, and the reference signal position at least partially overlaps with a data position associated with data.

Aspect 20: The method of aspect 19, further comprising: outputting the one or more reference signals and the data in accordance with the configured first time-domain offset, wherein the one or more reference signals and the data are time-division multiplexed.

Aspect 21: The method of any of aspects 19 through 20, further comprising: outputting the one or more reference signals and the data in accordance with the configured first time-domain offset, wherein the one or more reference signals and the data are frequency-division multiplexed.

Aspect 22: The method of any of aspects 15 through 21, further comprising: obtaining a capability message comprising UE capability information, the UE capability information indicating a duration associated with transitioning to an awake mode from one or more sleep modes, a duration associated with transitioning to the one or more sleep modes from the awake mode, or both, and further indicating one or more power consumption parameters associated with a UE, the awake mode the one or more sleep modes, the transitions, or a combination thereof, wherein the reference signal configuration is based at least in part on the UE capability information.

Aspect 23: The method of any of aspects 15 through 22, further comprising: determining a duration associated with transitioning to an awake mode from one or more sleep modes, a duration associated with transitioning to the one or more sleep modes from the awake mode, or both, and further determining one or more power consumption parameters associated with the UE, the awake mode, the one or more sleep modes, the transitions, or a combination thereof, wherein the reference signal configuration is based at least in part on the durations and the one or more power consumption parameters.

Aspect 24: The method of any of aspects 15 through 23, wherein the reference signal configuration indicates respective time-domain gaps at least before or after the reference signal position during which data is excluded from transmission.

Aspect 25: The method of any of aspects 15 through 24, wherein the configured first time-domain offset applies between the reference signal position and a configured ON duration for a DRX mode.

Aspect 26: The method of any of aspects 15 through 25, wherein the first control message indicates one or more additional reference signal configurations indicating respective reference signal positions associated with one or more additional reference signals that are periodic or semi-persistent, the configured first time-domain offset applies between reference signal positions of at least one pair of additional reference signals, the one or more reference signals, and the one or more WUSs.

Aspect 27: The method of any of aspects 15 through 26, wherein the reference signal configuration corresponds to one or more UEs within one or more cells, and the WUS configuration corresponds to one or more UEs or a group of UEs, and an additional reference signal configuration corresponds to the UE.

Aspect 28: The method of any of aspects 15 through 27, wherein the one or more WUSs and the one or more reference signals are output while the UE is in an awake mode or one or more sleep modes.

Aspect 29: A UE for wireless communications, comprising one or more memories storing processor-executable code, and one or more processors coupled with the one or more memories and individually or collectively operable to execute the code to cause the UE to perform a method of any of aspects 1 through 14.

Aspect 30: A UE for wireless communications, comprising at least one means for performing a method of any of aspects 1 through 14.

Aspect 31: A non-transitory computer-readable medium storing code for wireless communications, the code comprising instructions executable by one or more processors to perform a method of any of aspects 1 through 14.

Aspect 32: A network entity for wireless communications, comprising one or more memories storing processor-executable code, and one or more processors coupled with the one or more memories and individually or collectively operable to execute the code to cause the network entity to perform a method of any of aspects 15 through 28.

Aspect 33: A network entity for wireless communications, comprising at least one means for performing a method of any of aspects 15 through 28.

Aspect 34: A non-transitory computer-readable medium storing code for wireless communications, the code comprising instructions executable by one or more processors to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
      receive, while operating in a discontinuous reception mode, a first control message indicating a reference signal configuration, the reference signal configuration indicating a reference signal position associated with one or more reference signals;

receive a second control message indicating a wakeup signal configuration, the wakeup signal configuration indicating a wakeup signal position that is associated with one or more wakeup signals and within a configured first time-domain offset of the reference signal position in accordance with the reference signal configuration, wherein the reference signal position is within a discontinuous reception cycle period that is within a configured second time-domain offset of the wakeup signal position, and wherein the configured first time-domain offset is based at least in part one or more durations associated with a transition from an active state to a sleep state; and monitor, in accordance with the configured first time-domain offset, for the one or more wakeup signals and the one or more reference signals.

2. The UE of claim 1, wherein the reference signal position is before the wakeup signal position in time in accordance with the configured first time-domain offset.

3. The UE of claim 1, wherein the reference signal position is after the wakeup signal position in time in accordance with the configured first time-domain offset.

4. The UE of claim 1, wherein:

the reference signal position is associated with a synchronization signal block (SSB)-based measurement timing configuration (SMTC) and is after the wakeup signal position in time in accordance with the configured first time-domain offset, and the reference signal position is followed by a data position associated with data.

5. The UE of claim 4, wherein the one or more processors are individually or collectively further operable to execute the code to cause the UE to:

refrain from monitoring for the one or more reference signals based at least in part on a failure to receive a wakeup signal in accordance with the wakeup signal position.

6. The UE of claim 1, wherein:

the reference signal position is after the wakeup signal position in time in accordance with the configured first time-domain offset, and the reference signal position at least partially overlaps with a data position associated with data.

7. The UE of claim 6, wherein the one or more processors are individually or collectively further operable to execute the code to cause the UE to:

monitor for the one or more reference signals and the data in accordance with the configured first time-domain offset, wherein the one or more reference signals and the data are time-division multiplexed.

8. The UE of claim 6, wherein the one or more processors are individually or collectively further operable to execute the code to cause the UE to:

monitor for the one or more reference signals and the data in accordance with the configured first time-domain offset, wherein the one or more reference signals and the data are frequency-division multiplexed.

9. The UE of claim 1, wherein the one or more processors are individually or collectively further operable to execute the code to cause the UE to:

transmit a capability message comprising UE capability information, the UE capability information indicating a duration associated with a transition to an awake mode from one or more sleep modes, a duration associated with a transition to the one or more sleep modes from the awake mode, or both, and further indicating one or more power consumption parameters associated with the UE, the awake mode, the one or more sleep modes, the transitions, or a combination thereof, wherein the reference signal configuration is based at least in part on the UE capability information.

10. The UE of claim 1, wherein the reference signal configuration indicates respective time-domain gaps at least before or after the reference signal position during which data is excluded from transmission.

11. The UE of claim 1, wherein the configured first time-domain offset applies between the reference signal position and a configured ON duration for the discontinuous reception mode.

12. The UE of claim 1, wherein the first control message indicates one or more additional reference signal configurations indicating respective reference signal positions associated with one or more additional reference signals that are periodic or semi-persistent, and wherein the configured first time-domain offset applies between reference signal positions of at least one pair of additional reference signals, the one or more reference signals, and the one or more wakeup signals.

13. The UE of claim 1, wherein the reference signal configuration corresponds to one or more UEs within one or more cells, and the wakeup signal configuration corresponds to one or more UEs or a group of UEs, and an additional reference signal configuration corresponds to the UE.

14. The UE of claim 1, wherein the UE monitors for the one or more wakeup signals and the one or more reference signals while the UE is in an awake mode or one or more sleep modes.

15. A network entity, comprising:

one or more memories storing processor-executable code; and one or more processors coupled with the one or more memories and individually or collectively operable to execute the code to cause the network entity to:

output a first control message indicating a reference signal configuration, the reference signal configuration indicating a reference signal position associated with one or more reference signals;

output a second control message indicating a wakeup signal configuration, the wakeup signal configuration indicating a wakeup signal position that is associated with one or more wakeup signals and within a configured first time-domain offset of the wakeup signal position in accordance with the reference signal configuration, wherein the reference signal position is within a discontinuous reception cycle period that is within a configured second time-domain offset of the wakeup signal position, and wherein the configured first time-domain offset is based at least in part one or more durations associated with a user equipment (UE) transition from an active state to a sleep state; and output, in accordance with the configured first time-domain offset, the one or more wakeup signals and the one or more reference signals.

16. The network entity of claim 15, wherein the reference signal position is before the wakeup signal position in time in accordance with the configured first time-domain offset.

17. The network entity of claim 15, wherein the reference signal position is after the wakeup signal position in time in accordance with the configured first time-domain offset.

18. The network entity of claim 15, wherein:

the reference signal position is associated with a synchronization signal block (SSB)-based measurement timing configuration (SMTC) and is after the wakeup signal position in time in accordance with the configured first time-domain offset, and the reference signal position is followed by a data position associated with data.

19. The network entity of claim 15, wherein:

the reference signal position is after the wakeup signal position in time in accordance with the configured first time-domain offset, and the reference signal position at least partially overlaps with a data position associated with data.

20. The network entity of claim 19, wherein the one or more processors are individually or collectively further operable to execute the code to cause the network entity to:

output the one or more reference signals and the data in accordance with the configured first time-domain offset, wherein the one or more reference signals and the data are time-division multiplexed.

21. The network entity of claim 19, wherein the one or more processors are individually or collectively further operable to execute the code to cause the network entity to:

output the one or more reference signals and the data in accordance with the configured first time-domain offset, wherein the one or more reference signals and the data are frequency-division multiplexed.

22. The network entity of claim 15, wherein the one or more processors are individually or collectively further operable to execute the code to cause the network entity to:

obtain a capability message comprising UE capability information, the UE capability information indicating a duration associated with transitioning to an awake mode from one or more sleep modes, a duration associated with transitioning to the one or more sleep modes from the awake mode, or both, and further indicating one or more power consumption parameters associated with a UE, the awake mode the one or more sleep modes, the transitions, or a combination thereof, wherein the reference signal configuration is based at least in part on the UE capability information.

23. The network entity of claim 15, wherein the one or more processors are individually or collectively further operable to execute the code to cause the network entity to:

determine a duration associated with transitioning to an awake mode from one or more sleep modes, a duration associated with transitioning to the one or more sleep modes from the awake mode, or both, and further determining one or more power consumption parameters associated with the UE, the awake mode, the one or more sleep modes, the transitions, or a combination thereof, wherein the reference signal configuration is based at least in part on the durations and the one or more power consumption parameters.

24. The network entity of claim 15, wherein the reference signal configuration indicates respective time-domain gaps at least before or after the reference signal position during which data is excluded from transmission.

25. The network entity of claim 15, wherein the configured first time-domain offset applies between the reference signal position and a configured ON duration for a discontinuous reception mode.

26. The network entity of claim 15, wherein the first control message indicates one or more additional reference signal configurations indicating respective reference signal positions associated with one or more additional reference signals that are periodic or semi-persistent, and wherein the configured first time-domain offset applies between reference signal positions of at least one pair of additional reference signals, the one or more reference signals, and the one or more wakeup signals.

27. The network entity of claim 15, wherein the reference signal configuration corresponds to one or more UEs within one or more cells, and the wakeup signal configuration corresponds to one or more UEs or a group of UEs, and an additional reference signal configuration corresponds to the UE.

28. The network entity of claim 15, wherein the one or more wakeup signals and the one or more reference signals are output while the UE is in an awake mode or one or more sleep modes.

29. A method for wireless communications at a user equipment (UE), comprising:

receiving, while operating in a discontinuous reception mode, a first control message indicating a reference signal configuration, the reference signal configuration indicating a reference signal position associated with one or more reference signals;

receiving a second control message indicating a wakeup signal configuration, the wakeup signal configuration indicating a wakeup signal position that is associated with one or more wakeup signals and within a configured first time-domain offset of the reference signal position in accordance with the reference signal configuration, wherein the reference signal position is within a discontinuous reception cycle period that is within a configured second time-domain offset of the wakeup signal position, and wherein the configured first time-domain offset is based at least in part one or more durations associated with the UE transitioning from an active state to a sleep state; and monitoring, in accordance with the configured first time-domain offset, for the one or more wakeup signals and the one or more reference signals.

30. A method for wireless communications at a network entity, comprising:

outputting a first control message indicating a reference signal configuration, the reference signal configuration indicating a reference signal position associated with one or more reference signals;

outputting a second control message indicating a wakeup signal configuration, the wakeup signal configuration indicating a wakeup signal position that is associated with one or more wakeup signals and within a configured first time-domain offset of the wakeup signal position in accordance with the reference signal configuration, wherein the reference signal position is within a discontinuous reception cycle period that is within a configured second time-domain offset of the wakeup signal position, and wherein the configured first time-domain offset is based at least in part one or more durations associated with a user equipment (UE) transitioning from an active state to a sleep state; and outputting, in accordance with the configured first time-domain offset, the one or more wakeup signals and the one or more reference signals.

* * * * *